(12) United States Patent
German, III et al.

(10) Patent No.: US 12,311,854 B2
(45) Date of Patent: May 27, 2025

(54) FAIL-SAFE SIGNAL INJECTION

(71) Applicant: Sygnal Technologies, Inc., Moscow, ID (US)

(72) Inventors: Paul Masten German, III, Livingston, TX (US); Joshua John Hartung, Moscow, ID (US)

(73) Assignee: Sygnal Technologies, Inc., Moscow, ID (US)

( * ) Notice: Subject to any disclaimer, the term of this patent is extended or adjusted under 35 U.S.C. 154(b) by 656 days.

(21) Appl. No.: 17/496,723

(22) Filed: Oct. 7, 2021

(65) Prior Publication Data

US 2023/0109877 A1 Apr. 13, 2023

(51) Int. Cl.
*B60R 16/03* (2006.01)
*H04L 12/40* (2006.01)

(52) U.S. Cl.
CPC .......... *B60R 16/0315* (2013.01); *H04L 12/40* (2013.01); *H04L 2012/40273* (2013.01)

(58) Field of Classification Search
CPC ............ G05B 19/0428; G05B 19/4063; G05B 19/058; G05B 19/0425; G05B 19/048; G05D 1/0055; G05D 1/0077; G05D 1/0214; B60W 50/023
See application file for complete search history.

(56) References Cited

U.S. PATENT DOCUMENTS

| 5,074,626 | A | * | 12/1991 | Kramer | .................. | B60T 8/885 |
| | | | | | | 303/122.04 |
| 5,271,474 | A | * | 12/1993 | Nishimoto | ........... | B62D 5/0493 |
| | | | | | | 180/404 |
| 5,723,972 | A | * | 3/1998 | Bartol | .................. | H02J 7/1423 |
| | | | | | | 322/15 |

(Continued)

FOREIGN PATENT DOCUMENTS

IN 2020011027304 * 10/2020

OTHER PUBLICATIONS

"FSA515: 5V SPST Depletion Switch with Negative Swing", Semiconductor Components Industries, LLC, Online Datasheet [retrieved May 19, 2021]. Retrieved from the Internet <https://www.onsemi.com/pdf/datasheet/fsa515-d.pdf>., Dec. 2018, 5 pages.

(Continued)

*Primary Examiner* — Steven B Theriault
(74) *Attorney, Agent, or Firm* — FIG. 1 Patents

(57) ABSTRACT

A fail-safe signal injection system includes a fail-safe system controller that receives a control command and initiates to bypass a first system to inject a control signal into a second system responsive to the control command. The fail-safe signal injection system also includes a signal injection circuit implemented to inject the control signal into the second system responsive to power applied to the signal injection circuit, the signal injection circuit further implemented to fail-safe without the power applied, and thus operates to pass a control input from the first system through (Continued)

to the second system. The signal injection circuit includes a fail-safe isolation circuit designed to pass the control input from the first system through to the second system when driven for fail-safe pass through, and bypass the first system to inject the control signal into the second system when driven to isolate the first system from the second system.

20 Claims, 12 Drawing Sheets

(56) References Cited

U.S. PATENT DOCUMENTS

| | | | | |
|---|---|---|---|---|
| 5,897,596 | A * | 4/1999 | Kabune | G05B 23/0291 714/E11.017 |
| 6,173,697 | B1 * | 1/2001 | Goto | F02D 41/221 123/396 |
| 6,381,506 | B1 * | 4/2002 | Grappone | G05B 9/03 326/14 |
| 6,498,403 | B1 * | 12/2002 | Hagidaira | B62D 5/0484 307/9.1 |
| 9,195,232 | B1 * | 11/2015 | Egnor | B60W 50/023 |
| 9,606,537 | B2 * | 3/2017 | Hogenmueller | B60W 30/00 |
| 9,740,178 | B2 * | 8/2017 | Debouk | B60W 50/023 |
| 10,312,823 | B1 * | 6/2019 | Montgomery | H02M 7/44 |
| 10,372,007 | B1 * | 8/2019 | Nagel | H02J 4/00 |
| 10,720,913 | B1 * | 7/2020 | Leong | H03K 17/08142 |
| 10,933,885 | B1 * | 3/2021 | Banks, III | B60W 50/0205 |
| 10,979,032 | B1 * | 4/2021 | Leong | H03K 3/012 |
| 11,009,874 | B2 * | 5/2021 | Greenfield | G01C 21/1652 |
| 11,169,521 | B2 * | 11/2021 | Park | B60W 50/045 |
| 11,338,827 | B2 * | 5/2022 | Ju | B60W 50/023 |
| 11,456,735 | B1 * | 9/2022 | Leong | H03K 17/162 |
| 11,513,814 | B1 * | 11/2022 | Luban | G06F 1/3215 |
| 11,724,708 | B2 * | 8/2023 | Gong | B60W 10/18 701/26 |
| 11,787,425 | B2 * | 10/2023 | Shinoda | B60W 60/00186 701/29.2 |
| 11,947,432 | B2 * | 4/2024 | Kuschnerus | G06F 13/4022 |
| 2004/0239483 | A1 * | 12/2004 | Flick | G08C 17/02 340/5.72 |
| 2007/0000712 | A1 * | 1/2007 | Kamiya | B60R 25/24 180/287 |
| 2009/0062976 | A1 * | 3/2009 | Koski | F16H 61/12 361/170 |
| 2009/0106606 | A1 * | 4/2009 | Duan | G06F 11/0739 714/48 |
| 2011/0112716 | A1 * | 5/2011 | Joeng | B60W 50/0205 701/41 |
| 2012/0095669 | A1 * | 4/2012 | Katsurahara | F02D 41/221 701/107 |
| 2012/0265359 | A1 * | 10/2012 | Das | G06F 13/42 700/286 |
| 2012/0268107 | A1 * | 10/2012 | Laturner | G05B 9/02 324/161 |
| 2013/0073761 | A1 * | 3/2013 | Nierop | H04L 12/40045 710/316 |
| 2013/0082634 | A1 * | 4/2013 | Bokusky | G05B 9/02 318/563 |
| 2014/0062386 | A1 * | 3/2014 | Maher | H01M 10/486 374/E1.002 |
| 2014/0172227 | A1 * | 6/2014 | Tsukidate | G06F 11/0739 701/29.2 |
| 2014/0278696 | A1 * | 9/2014 | Anderson | G06Q 10/047 705/7.23 |
| 2015/0152820 | A1 * | 6/2015 | Kojima | F01L 9/20 123/479 |
| 2015/0344039 | A1 * | 12/2015 | Amoh | H01L 23/62 701/1 |
| 2016/0154716 | A1 * | 6/2016 | Lee | G06F 1/30 714/14 |
| 2016/0323386 | A1 * | 11/2016 | Wideman | H04L 63/101 |
| 2017/0047188 | A1 * | 2/2017 | Smith | B60R 16/0231 |
| 2018/0015937 | A1 * | 1/2018 | Woo | B61K 9/10 |
| 2018/0093660 | A1 * | 4/2018 | Koshiba | B60W 10/02 |
| 2018/0194306 | A1 * | 7/2018 | Rtail | F02N 11/14 |
| 2019/0067961 | A1 * | 2/2019 | King | H02J 7/0045 |
| 2020/0039499 | A1 * | 2/2020 | Passman | B60W 50/10 |
| 2020/0231046 | A1 * | 7/2020 | Taniguchi | B60K 7/0007 |
| 2020/0283038 | A1 * | 9/2020 | Woo | B61L 3/10 |
| 2020/0324719 | A1 * | 10/2020 | Mahmoud | H04L 12/10 |
| 2020/0328660 | A1 * | 10/2020 | Guo | B60L 3/0084 |
| 2021/0104902 | A1 * | 4/2021 | Yamauchi | B60L 3/0092 |
| 2021/0111621 | A1 * | 4/2021 | Rince | H02P 29/0243 |
| 2021/0285467 | A1 * | 9/2021 | Wenker | B66F 11/044 |
| 2021/0405895 | A1 * | 12/2021 | Kim | G06F 3/0604 |
| 2022/0147481 | A1 * | 5/2022 | Hirst | G06F 13/4068 |
| 2024/0051554 | A1 * | 2/2024 | Ko | B60W 50/023 |
| 2024/0051578 | A1 * | 2/2024 | Ko | B60W 50/029 |

OTHER PUBLICATIONS

"FSA550: 4PST Depletion Mode Isolation Switch", Semiconductor Components Industries, LLC, Online Datasheet [retrieved May 19, 2021]. Retrieved from the Internet <https://www.onsemi.com/pdf/datasheet/fsa550-d.pdf>., Nov. 2014, 8 pages.

"FSA553: Dual SPST Depletion Mode Audio Switch with Negative Swing", Semiconductor Components Industries, LLC, Online Datasheet [retrieved May 19, 2021]. Retrieved from the Internet <https://www.onsemi.com/pdf/datasheet/fsa553-d.pdf>., Apr. 2015, 9 pages.

* cited by examiner

FAIL-SAFE SIGNAL INJECTION

BACKGROUND

Electronic automotive systems require a high degree of reliability and must always operate in a safe way to protect the lives of the people who are being transported in a vehicle. In the design of automotive electrical systems, there are instances when analog and/or digital signals are multiplexed or injected into a vehicle system to effectuate an outcome, such as to change a vehicle operation or mode. Generally, conventional integrated circuits, or circuits implemented with discrete components are available, but fail to meet the rigorous automotive standards, such as being able to withstand wide temperature ranges, maintain extremely high reliability rates, and the requirement to fail to a known, safe state without the addition of backup power sources.

SUMMARY

This Summary introduces features and concepts of fail-safe signal injection, which is further described below in the Detailed Description and shown in the Figures. This Summary should not be considered to describe essential features of the claimed subject matter, nor used to determine or limit the scope of the claimed subject matter.

Aspects of fail-safe signal injection are described. A fail-safe signal injection system includes a fail-safe system controller that receives a control command and initiates to bypass a first system to inject a control signal into a second system responsive to the control command. The fail-safe signal injection system also includes a signal injection circuit implemented to inject the control signal into the second system responsive to power applied to the signal injection circuit. The signal injection circuit is further implemented to fail-safe without the power applied, and thus operates to pass a control input from the first system through to the second system. The signal injection circuit operates as a multiplexer, which interfaces between the second system and a device application that initiates the control command.

The signal injection circuit includes a fail-safe isolation circuit designed to pass the control input from the first system through to the second system when the fail-safe isolation circuit is driven for fail-safe pass through, and bypass the first system to inject the control signal into the second system when the fail-safe isolation circuit is driven to isolate the first system from the second system. The fail-safe isolation circuit is implemented with depletion mode FETs designed to isolate the first system, linking the fail-safe system controller to the second system. Additionally, the depletion mode FETs of the fail-safe isolation circuit are designed to fail-safe to link the first system to the second system when driven for fail-safe pass through.

The fail-safe system controller is also designed to receive a signal output from the signal injection circuit and monitor the signal output to detect a failure of the signal injection circuit. The fail-safe system controller can then initiate to switch to a fail-safe state of the signal injection circuit, and link the first system to the second system responsive to a detected failure of the signal injection circuit. An implementation of fail-safe signal injection has separable power domains, including a system power domain that encompasses at least the first system and the second system, and a fail-safe power domain that encompasses the fail-safe system controller and the signal injection circuit. The depletion mode FETs of the signal injection circuit are designed to fail-safe to link the first system to the second system responsive to power loss in the fail-safe power domain.

In additional aspects of fail-safe signal injection, an automotive control system includes a fail-safe system controller that receives a vehicle control command from a vehicle application, and initiates to bypass a vehicle control device to inject a control signal into a vehicle control system responsive to the vehicle control command. The automotive control system also includes a signal injection circuit implemented to inject the control signal into the vehicle control system responsive to power applied to the signal injection circuit. The signal injection circuit is also implemented to fail-safe without the power applied, and thus operates to pass a vehicle control input from the vehicle control device through the signal injection circuit to the vehicle control system. The signal injection circuit includes automotive-grade transistors and operates as a multiplexer that interfaces between the vehicle control system and the vehicle application that initiates the vehicle control command.

The signal injection circuit includes a fail-safe isolation circuit designed to pass the vehicle control input from the vehicle control device through to the vehicle control system when the fail-safe isolation circuit is driven for fail-safe pass through, and bypass the vehicle control device to inject the control signal into the vehicle control system when the fail-safe isolation circuit is driven to isolate the vehicle control device from the vehicle control system. The fail-safe isolation circuit is implemented with depletion mode FETs designed to isolate the vehicle control device, linking the fail-safe system controller to the vehicle control system. Additionally, the depletion mode FETs of the fail-safe isolation circuit are designed to fail-safe to link the vehicle control device to the vehicle control system when driven for fail-safe pass through.

The fail-safe system controller is also designed to receive an indication of a user input to control the vehicle, and initiate the signal injection circuit to switch to a fail-safe state, relinquishing vehicle control and the vehicle control device being linked to the vehicle control system. The fail-safe system controller can receive a signal output from the signal injection circuit and monitor the signal output to detect a failure of the signal injection circuit. The fail-safe system controller can then initiate to switch to a fail-safe state of the signal injection circuit, and link the vehicle control device to the vehicle control system responsive to a detected failure of the signal injection circuit. An implementation of fail-safe signal injection has separable power domains, including a system power domain that encompasses at least the vehicle control device and the vehicle control system, and a fail-safe power domain that encompasses the fail-safe system controller and the signal injection circuit. The depletion mode FETs of the signal injection circuit are designed to fail-safe to link the vehicle control device to the vehicle control system responsive to power loss in the fail-safe power domain.

BRIEF DESCRIPTION OF THE DRAWINGS

Implementations of the techniques for fail-safe signal injection are described with reference to the following Figures. The same numbers may be used throughout to reference like features and components shown in the Figures.

DETAILED DESCRIPTION

Figure 1:
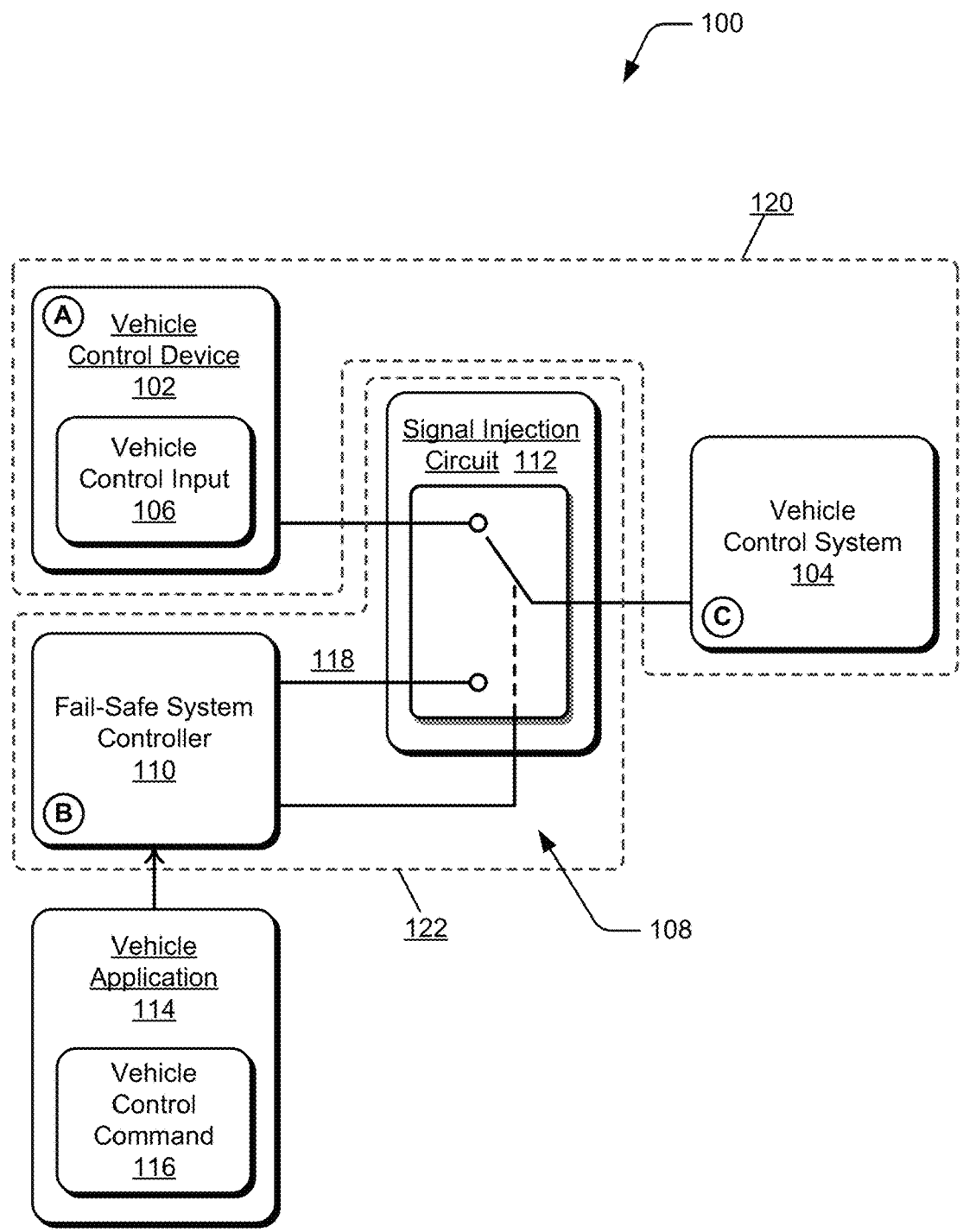
FIG. 1 illustrates an example of an automotive control system in accordance with one or more implementations of fail-safe signal injection as described herein.

Implementations of fail-safe signal injection are described, and provide techniques that can be implemented in any type of electronic circuit, such as an automotive control system. A fail-safe signal injection system is designed for general application in any type of an analog or digital system that utilizes fail-safe signal injection with high reliability. Electronic automotive systems require a high degree of reliability and must safely operate a vehicle. However, conventional integrated circuits, as well as circuits implemented with discrete components, often fail to meet rigorous automotive standards, particularly in automotive electrical system designs where analog and/or digital signals are multiplexed or injected into a vehicle system to effectuate an outcome, such as to change a vehicle operation or mode.

The described techniques for fail-safe signal injection provide for implementations of a signal injection circuit that is implemented with automotive-grade transistors, which are designed in accordance with automotive requirements for widely varying temperature ranges and high reliability. Notably, a fail-safe signal injection system is implemented to replicate the functionality of an automotive control system, or other type of electronic system, for fail-safe signal injection with components that are highly reliable, temperature variant, and economical in implementation, as well as fail-safe in the event of a loss of power. In an automotive control system, for example, aspects of fail-safe signal injection can be implemented, such as in a driver-assisted vehicle, in an autonomous vehicle, and/or in any other type of vehicle. In the example of an automotive control system, a vehicle has a vehicle control device and a vehicle control system, where the vehicle control device may be any type of a vehicle controller, sensor, or actuator that generates a control input as a control command that is communicated to the vehicle control system, such as any type of vehicle computer and/or controller.

For example, the vehicle control device may be the accelerator pedal and the vehicle control system is the corresponding engine computer that receives the control input, which is adapted to control the engine according to the accelerator pedal adjustment to increase or decrease the speed of the vehicle. Similarly, the vehicle control device may be a brake pedal position sensor and the vehicle control system is the corresponding automatic or anti-lock braking system computer that receives the control input, which is adapted to control the braking system according to the brake pedal adjustment to stop or decrease the speed of the vehicle. Further, the vehicle control device may be a torque sensor on the electric power steering unit that senses the torque input to the steering wheel, and the vehicle control system is the corresponding steering controller that receives the control input and actuates the drive motor of the power steering system according to the steering wheel torque input to turn the vehicle. Generally, the vehicle control device communicates any type of a control input to the vehicle control system to effectuate some type of control response from the vehicle.

In the described techniques for fail-safe signal injection, the automotive control system can also be implemented with a fail-safe signal injection system, which includes a fail-safe system controller and a signal injection circuit. The signal injection circuit can inject a control signal into an automotive control system, bypassing the vehicle control device and switching the signal source to the signal injection circuit, which then communicates the control input to the vehicle control system to effectuate the corresponding acceleration, braking, or steering control response from the vehicle.

Notably, the signal injection circuit operates as a multiplexer that interfaces between the vehicle control system and a vehicle application that initiates a vehicle control command. The signal injection circuit is designed for power-off, pass through functionality, and operates even when power is not applied. The signal injection circuit can be implemented in a vehicle unpowered, and the vehicle operates as intended for human driver control. In implementations, the signal injection circuit includes a fail-safe isolation circuit that is designed to pass a control input from a vehicle control device through to the corresponding vehicle control system when the fail-safe isolation circuit is driven for fail-safe pass through. The fail-safe isolation circuit of the signal injection circuit is also designed to bypass the vehicle control device to inject a control signal into the vehicle control system when the fail-safe isolation circuit is driven to isolate the vehicle control device from the vehicle control system.

The described techniques for fail-safe signal injection also provide for implementations of separable power domains, including a system power domain that encompasses the vehicle control device and the vehicle control system, and a fail-safe power domain that encompasses the fail-safe system controller and the signal injection circuit of the fail-safe signal injection system. In the event of a power failure of the fail-safe power domain, the signal injection circuit is designed to fail-safe and disconnect the fail-safe system controller from the system, thus linking or reestablishing the vehicle control device connection to the vehicle control system, which is a known safe state of the automotive control system in the vehicle. The signal injection circuit is implemented to fail-safe without power applied, and thus operates to pass a control input from the vehicle control device through the signal injection circuit to the vehicle control system.

While features and concepts of fail-safe signal injection can be implemented in any number of different devices, systems, environments, and/or configurations, implementations of fail-safe signal injection are described in the context of the following example devices, systems, and methods.

FIG. 1 illustrates an example of an automotive control system 100 in which aspects of fail-safe signal injection can be implemented, such as in a driver-assisted vehicle, in an autonomous vehicle, and/or in any other type of vehicle. In this automotive control system 100, a vehicle can include a vehicle control device 102 and a vehicle control system 104. Generally, the vehicle control device 102 may be any type of a vehicle controller, sensor, or actuator that generates a vehicle control input 106 as a control command that is communicated to the vehicle control system 104, such as any type of vehicle computer and/or controller. For example, the vehicle control device 102 may be the accelerator pedal and the vehicle control system 104 is the corresponding engine computer that receives the vehicle control input 106, which is adapted to control the engine according to the accelerator pedal adjustment to increase or decrease the speed of the vehicle.

Similarly, the vehicle control device 102 may be a brake pedal position sensor and the vehicle control system 104 is the corresponding automatic or anti-lock braking system computer that receives the vehicle control input 106, which is adapted to control the braking system according to the brake pedal adjustment to stop or decrease the speed of the vehicle. In another example, the vehicle control device 102 may be a torque sensor on the electric power steering unit that senses the torque input to the steering wheel, and the vehicle control system 104 is the corresponding steering controller that receives the vehicle control input 106 and actuates the drive motor of the power steering system according to the steering wheel torque input to turn the vehicle. Generally, the vehicle control device 102 can communicate any type of a vehicle control input 106 to the vehicle control system 104 to effectuate some type of control response from the vehicle.

The automotive control system 100 is also implemented with a fail-safe signal injection system 108, which in this example, includes a fail-safe system controller 110 and a signal injection circuit 112. The fail-safe signal injection system 108 can be implemented in new vehicles, or alternatively, interposed in an existing automotive control system as an interface between a vehicle application 114 and the vehicle control system 104. For example, the vehicle application 114 may be implemented in a driver-assisted and/or autonomous vehicle, and initiate a vehicle control command 116 that is communicated via the fail-safe signal injection system 108 to the vehicle control system 104.

Notably, the vehicle application 114 takes the place of human vehicle control that is registered with the vehicle control device 102 and communicated as the vehicle control input 106 to the vehicle control system 104. The fail-safe system controller 110 intervenes in the automotive control system 100, allowing the vehicle application 114 to effectuate a change in the vehicle control with the vehicle control command 116, and without human driver input to the vehicle control system. The signal injection circuit 112 of the fail-safe signal injection system 108 injects signals into the vehicle control system 104, such as responsive to a vehicle control command 116 received from the vehicle application 114. Generally, the vehicle control command 116 may be an engine control command to increase or decrease the speed of the vehicle, a braking system command to stop or decrease the speed of the vehicle, or a steering system command to turn the vehicle. Accordingly, the fail-safe system controller 110 generates a corresponding control signal 118, which is injected into the automotive control system by the signal injection circuit 112 and received by the vehicle control system 104 that effectuates the corresponding acceleration, braking, or steering control command.

The signal injection circuit 112 operates as a multiplexer that interfaces between the vehicle control system 104 and the vehicle application 114 that initiates the vehicle control command 116. Notably, the signal injection circuit 112 is designed for power-off, pass through functionality, and as a multiplexer, operates even when power is not applied. The signal injection circuit 112 can be implemented in a vehicle unpowered, and the vehicle operates as intended for human driver control. In implementations, the signal injection circuit 112 includes a fail-safe isolation circuit that is designed to pass the vehicle control input 106 from the vehicle control device 102 through to the vehicle control system 104 when the fail-safe isolation circuit is driven for fail-safe pass through. The fail-safe isolation circuit of the signal injection circuit 112 is also designed to bypass the vehicle control device 102 to inject the control signal 118 into the vehicle control system 104 when the fail-safe isolation circuit is driven to isolate the vehicle control device from the vehicle control system. Aspects and features of the fail-safe isolation circuit of the signal injection circuit 112 are further shown and described with reference to FIGS. 3-5.

The automotive control system 100 in this example implementation of fail-safe signal injection also has separable power domains, including a system power domain 120 that encompasses at least the vehicle control device 102 and the vehicle control system 104, and a fail-safe power domain 122 that encompasses the fail-safe system controller 110 and the signal injection circuit 112 of the fail-safe signal injection system 108. In the event of a power failure of the fail-safe power domain 122, the signal injection circuit 112 is designed to fail-safe and disconnect the fail-safe system controller 110 from the system, thus linking or reestablishing the vehicle control device 102 connection to the vehicle control system 104, which is a known safe state of the automotive control system 100 in the vehicle. The signal injection circuit 112 is implemented to fail-safe without power applied, and thus operates to pass the vehicle control input 106 from the vehicle control device 102 through the signal injection circuit to the vehicle control system 104.

In this described example implementation, the automotive control system 100 includes the fail-safe system controller 110 that receives the vehicle control command 116 from the vehicle application 114, and initiates to bypass the vehicle control device 102 to inject a control signal 118 into the vehicle control system 104 responsive to the vehicle control command. The automotive control system 100 also includes the signal injection circuit 112 implemented to inject the control signal 118 into the vehicle control system 104 responsive to power applied to the signal injection circuit. The signal injection circuit 112 is also implemented to fail-safe without the power applied, and thus operates to pass a vehicle control input 106 from the vehicle control device 102 through the signal injection circuit to the vehicle control system 104. The signal injection circuit 112 includes automotive-grade transistors and operates as a multiplexer that interfaces between the vehicle control system 104 and the vehicle application 114 that initiates the vehicle control command 116.

As shown and described with reference to FIG. 3, the signal injection circuit 112 includes a fail-safe isolation circuit designed to pass the vehicle control input 106 from the vehicle control device 102 through to the vehicle control system 104 when the fail-safe isolation circuit is driven for fail-safe pass through, and bypass the vehicle control device 102 to inject the control signal 118 into the vehicle control system 104 when the fail-safe isolation circuit is driven to isolate the vehicle control device from the vehicle control system. The fail-safe isolation circuit is implemented with depletion mode FETs designed to isolate the vehicle control device 102, linking the fail-safe system controller 110 to the vehicle control system 104. Additionally, the depletion mode FETs of the fail-safe isolation circuit are designed to fail-safe to link the vehicle control device 102 to the vehicle control system 104 when not powered.

The fail-safe system controller 110 is also designed to receive an indication of a user input to control the vehicle, and alter the voltage of the signal control input to the signal injection circuit 112 that operates to fail-safe and relinquish vehicle control by the vehicle control device 102 being linked to the vehicle control system 104. The fail-safe system controller 110 can receive a signal output from the signal injection circuit 112 and monitor the signal output to detect a failure of the signal injection circuit. The fail-safe system controller 110 can then alter the voltage of the signal control input to the signal injection circuit to switch to a fail-safe pass through state, or initiate a fault state causing the signal injection circuit 112 to switch to its fail-safe state, which links the vehicle control device 102 to the vehicle control system 104 responsive to a detected failure of the signal injection circuit.

In implementations, the vehicle control system 104 and/or the fail-safe system controller 110 may be implemented as computing devices or as components of computing devices. Generally, a computing device may be any type of an electronic, computing, and/or communication device implemented with various components, such as a processor (e.g., any type of a microprocessor, controller, application processor, and the like) and memory, as well as any number and combination of different components as further described with reference to the example device shown in FIG. 11. The device components can include logic components and/or logic elements, such as field-programmable gate arrays (FPGAs) and/or complex programmable logic devices (CPLDs). Alternatively or in addition, the vehicle control system 104 and/or the fail-safe system controller 110 may include independent processing, memory, and/or logic components functioning as a computing and/or electronic device. Additionally, the vehicle application 114 may be any type of computing device application or module, such as a software application implemented as executable software instructions (e.g., computer-executable instructions) that are executable with a processor of a computing device to implement features of the automotive control system.

Figure 2:
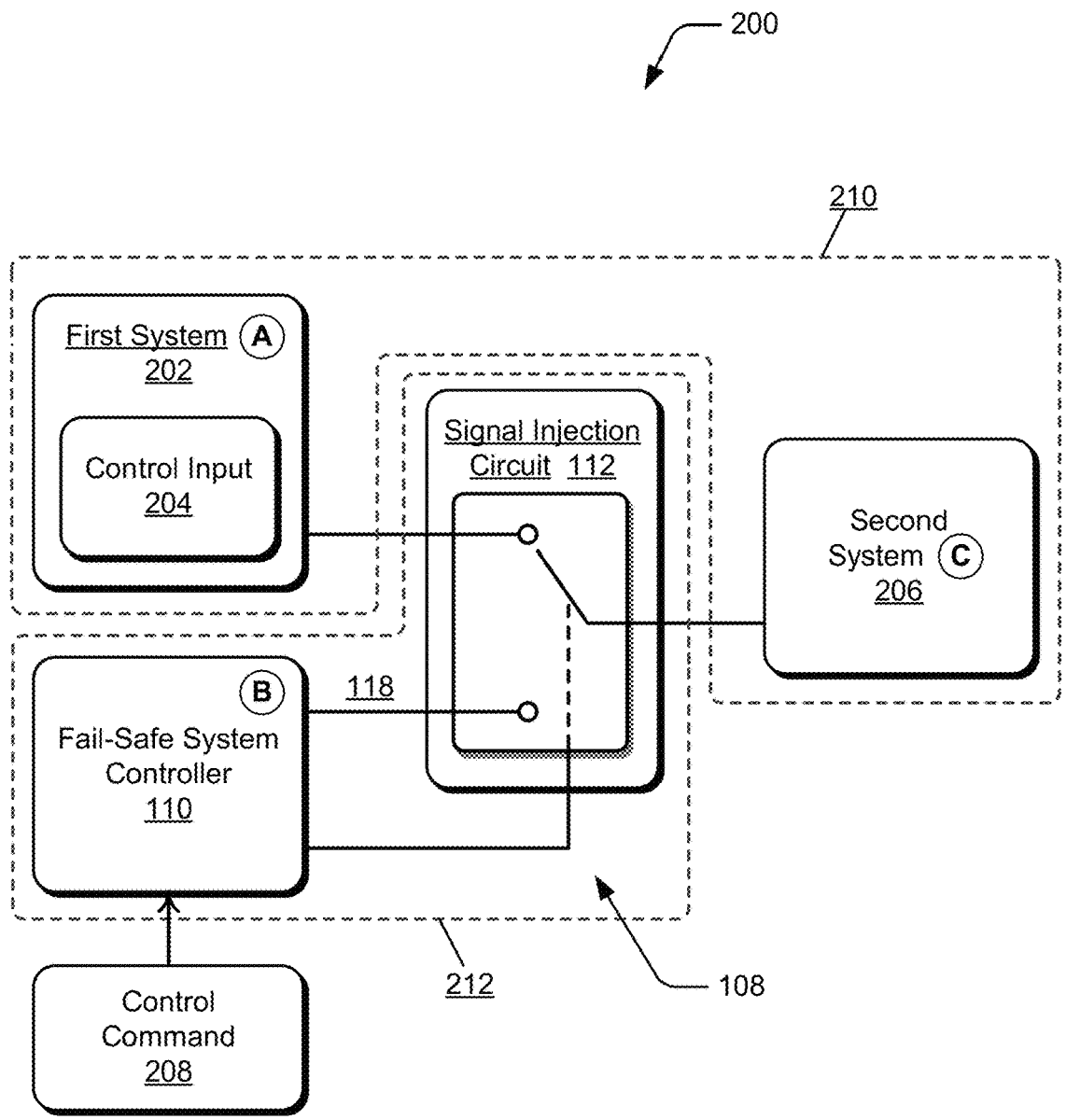
FIG. 2 further illustrates the example of fail-safe signal injection in accordance with one or more implementations as described herein.

FIG. 2 further illustrates an example 200 of fail-safe signal injection, as described herein and implemented in any type of an electronic system. In this example 200, the electronic system includes a first system 202 (also referred to herein as "system A") that communicates a control input 204 to a second system 206 (also referred to herein as "system C"). The electronic system is also implemented with the fail-safe signal injection system 108, as shown and described with reference to FIG. 1. The fail-safe signal injection system 108 includes the fail-safe system controller 110 (also referred to herein as "system B") and the signal injection circuit 112. The signal injection circuit 112 of the fail-safe signal injection system 108 injects signals into the second system 206, such as responsive to a control command 208 received from a device application.

The signal injection circuit 112 operates as a multiplexer that interfaces between the second system 206 and a device application that initiates the control command 208. Notably, the signal injection circuit 112 is designed for power-off, pass through functionality, and as a multiplexer, operates even when power is not applied. In implementations, the signal injection circuit 112 includes a fail-safe isolation circuit that is designed to pass the control input 204 from the first system 202 through to the second system 206 when the fail-safe isolation circuit is driven for fail-safe pass through. The fail-safe isolation circuit of the signal injection circuit 112 is also designed to bypass the first system 202 to inject the control signal 118 into the second system 206 when the fail-safe isolation circuit is driven to isolate the first system from the second system. Aspects and features of the fail-safe isolation circuit of the signal injection circuit 112 are further shown and described with reference to FIGS. 3-5.

The electronic system in this example 200 of fail-safe signal injection also has separable power domains, including a system power domain 210 that encompasses at least the first system 202 and the second system 206, and a fail-safe power domain 212 that encompasses the fail-safe system controller 110 and the signal injection circuit 112 of the fail-safe signal injection system 108. In the event of a power failure of the fail-safe power domain 212, the signal injection circuit 112 is designed to fail-safe and disconnect the fail-safe system controller 110 from the system, thus linking or reestablishing the first system 202 connection to the second system 206, which is a known safe state of the electronic system. The signal injection circuit 112 is implemented to fail-safe without power applied, and thus operates to pass the control input 204 from the first system 202 through the signal injection circuit to the second system 206.

In this describe example implementation, the electronic system includes the fail-safe system controller 110 that receives the control command 208 and initiates to bypass the first system 202 to inject the control signal 118 into the second system 206 responsive to the control command. The electronic system also includes the signal injection circuit 112 implemented to inject the control signal 118 into the second system 206 responsive to power applied to the signal injection circuit. The signal injection circuit 112 is also implemented to fail-safe without the power applied, and thus operates to pass a control input 204 from the first system 202 through the signal injection circuit 112 to the second system 206.

As shown and described with reference to FIG. 3, the signal injection circuit 112 includes a fail-safe isolation circuit designed to pass the control input 204 from the first system 202 through to the second system 206 when the fail-safe isolation circuit is driven for fail-safe pass through, and bypass the first system 202 to inject the control signal 118 into the second system 206 when the fail-safe isolation circuit is driven to isolate the first system from the second system. The fail-safe isolation circuit 112 is implemented with depletion mode FETs designed to isolate the first system 202, linking the fail-safe system controller 110 to the second system 206. Additionally, the depletion mode FETs of the fail-safe isolation circuit are designed to fail-safe to link the first system 202 to the second system 206 when not powered.

The fail-safe system controller 110 is also designed to receive a signal output from the signal injection circuit 112 and monitor the signal output to detect a failure of the signal injection circuit. The fail-safe system controller 110 can then initiate to switch to a fail-safe state of the signal injection circuit 112, and link the first system 202 to the second system 206 responsive to a detected failure of the signal injection circuit.

As noted above, the first system 202, the second system 206, and/or the fail-safe system controller 110 may be implemented as computing devices or as components of computing devices. Generally, a computing device may be any type of an electronic, computing, and/or communication device implemented with various components, such as a processor (e.g., any type of a microprocessor, controller, application processor, and the like) and memory, as well as any number and combination of different components as further described with reference to the example device shown in FIG. 11. The device components can include logic components and/or logic elements, such as field-programmable gate arrays (FPGAs) and/or complex programmable logic devices (CPLDs). Alternatively or in addition, the first system 202, the second system 206, and/or the fail-safe system controller 110 may include independent processing, memory, and/or logic components functioning as a computing and/or electronic device. Additionally, a device application may be any type of computing device application or module, such as a software application implemented as executable software instructions (e.g., computer-executable instructions) that are executable with a processor of a computing device to implement features of fail-safe signal injection.

Figure 3:
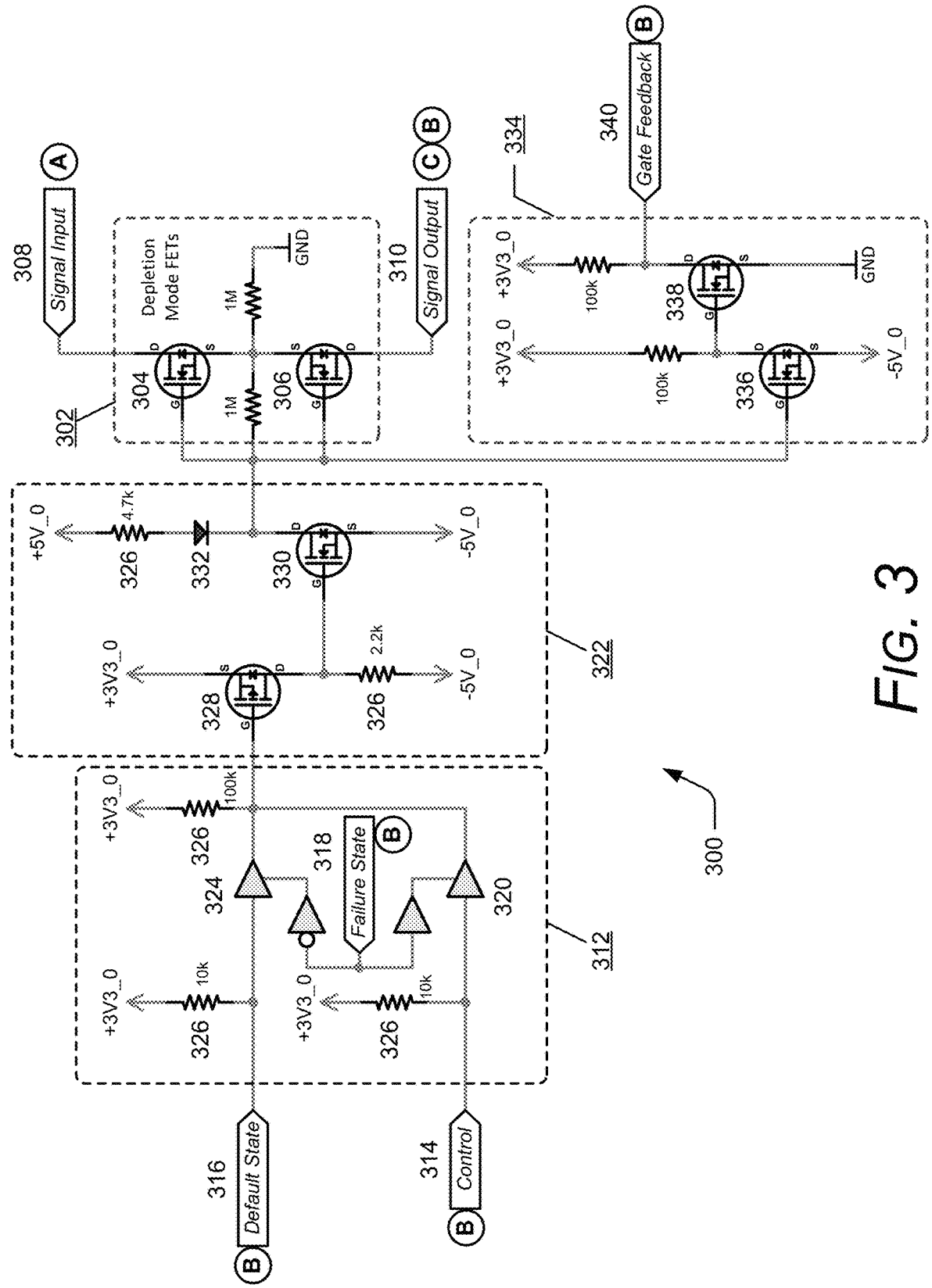
FIG. 3 illustrates an example of a signal injection circuit that includes a fail-safe isolation circuit in accordance with one or more implementations of fail-safe signal injection as described herein.

FIG. 3 illustrates an example 300 of the signal injection circuit 112, such as shown and described with reference to FIGS. 1 and 2. In this example 300, the signal injection circuit 112 includes the fail-safe isolation circuit 302, which is implemented with the depletion mode FETs (field effect transistors) 304, 306 as illustrated. For reference, the signal input 308 correlates to the vehicle control input 106 from the vehicle control device 102 (system A, FIG. 1), or to the control input 204 from the first system 202 (system A, FIG. 2). The signal output 310 correlates to the vehicle control system 104 (system C, FIG. 1), or to the second system (system C, FIG. 2). The fail-safe system controller 110 of the fail-safe signal injection system 108 also receives the signal output 310 routed through output isolation circuitry, such as further shown and described with reference to FIG. 4. In implementations, the signal output 310 can be generated as an analog voltage signal, a digital (1, 0) signal, a PWM (pulse width modulated) signal, and/or as any other form of circuit output signal utilizing any type of digital communication protocol, such as the single-edge nibble transmission (SENT) protocol for communicating signal values. Although the signal injection circuit 112 shown implemented in this example 300 can generate any form of signal output 310 between zero and five volts, the circuit can be implemented with components having different ratings to allow for larger or smaller ranges of output voltage signals.

The fail-safe isolation circuit 302 is designed with the depletion mode FETs 304, 306 for power-off, pass through functionality, and they operate to conduct and pass through the signal input 308 to the signal output 310 when they are not powered. Accordingly, when the fail-safe isolation circuit 302 is not powered, the vehicle control input 106 from the vehicle control device 102 is passed through to the vehicle control system 104 (e.g., the vehicle operates as intended for human control). Similarly, when the fail-safe isolation circuit 302 is not powered, the control input 204 from the first system 202 is passed through to the second system 206. In implementations, the signal injection circuit 112 is implemented with automotive-grade transistors, to include the depletion mode FETs 304, 306, which are designed in accordance with automotive requirements for widely varying temperature ranges and high reliability. Notably, the fail-safe signal injection system 108 replicates the functionality of the automotive control system 100 (FIG. 1) and the electronic system for fail-safe signal injection (FIG. 2) with components that are highly reliable, temperature variant, and economical in implementation, as well as fail-safe in the event of a loss of power.

In this example 300, the signal injection circuit 112 includes a control circuit 312, which operates to control the state of the signal injection circuit (e.g., the multiplexer) and functions to change the signal injection circuit to the fail-safe state in the event of a failure indication. The control circuit 312 can receive a control input 314, a default state input 316, and/or a system failure state input 318. The fail-safe system controller 110 (system B) can actuate the signal injection circuit 112 via the control input 314, and a buffer 320 (e.g., a logic gate) will pass the control input signal to a gate drive circuit 322. If the failure state input 318 is received from the fail-safe system controller 110 (system B) when a failure state is determined, then a buffer 324 will pass the default state signal from the default state input 316 to the gate drive circuit 322. Notably, the failure state input 318 controls whether the buffer 320 will pass the control input signal of the control input 314, or whether the buffer 324 will pass the default state signal from the default state input 316 to the gate drive circuit 322.

In implementations, if the default state input 316 controls the state of the signal injection circuit 112, then the fail-safe isolation circuit 302 is driven for fail-safe pass through and by default, system A is connected to system C through the depletion mode FETs 304, 306. The control input 314 and the default state input 316 at the control circuit 312 initiates the gate drive circuit 322 to drive the transistor gates of the depletion mode FETs 304, 306 to approximately either positive five volts (+5V) or negative five volts (−5V). For example, when the signal injection circuit 112 is unpowered, the transistor gates of the depletion mode FETs 304, 306 are pulled to the voltage of the respective transistor source by the resistor. This forces the depletion mode FETs 304, 306 into conduction, which provides for the fail-safe pass through state.

Alternatively, if the control input 314 controls the state of the signal injection circuit 112, then the fail-safe isolation circuit 302 is driven so that system A is isolated from system C by the depletion mode FETs 304, 306. Accordingly, the fail-safe system controller 110 (system B) is then linked to the vehicle control system 104 (system C, FIG. 1) or to the second system 206 (system C, FIG. 2) when the signal injection circuit 112 is powered, which precludes the depletion mode FETs 304, 306 from conducting and isolates system A from system C. The signal injection circuit 112 can then inject a control signal 118 into the automotive control system 100 (FIG. 1) responsive to the vehicle control command 116 received from the vehicle application 114. Similarly, the signal injection circuit 112 can inject a control signal 118 into the electronic system for fail-safe signal injection (FIG. 2) responsive to the control command 208 received from a device application.

The control circuit 312 and the gate drive circuit 322 of the signal injection circuit 112 includes the resistors 326 to limit current and control turn-off, turn-on timing to prevent switching transients. The gate drive circuit 322 of the signal injection circuit 112 includes the transistors 328, 330 that generate a drive voltage to drive the gates of the depletion mode FETs 304, 306 in the fail-safe isolation circuit 302. The transistor 328 of gate drive circuit 322 receives a voltage input corresponding to either the control signal input or the default state signal input from the control circuit 312 of the signal injection circuit (e.g., the multiplexer). When transistor 328 turns on, this also turns on transistor 330, which generates a negative five (−5) volts between the transistor 330 and the diode 332 at the gates of the depletion mode FETs 304, 306, causing the depletion mode FETs to stop conducting, which isolates system A from system C. Alternatively, when transistor 330 is turned off, the depletion mode FETs are conducting and system A is connected to system C.

In this example 300, the signal injection circuit 112 also includes a feedback circuit 334 with level-shifting transistors 336, 338 that generate a gate feedback 340 received by the fail-safe system controller 110 of the fail-safe signal injection system 108. The fail-safe system controller 110 can monitor the gate feedback 340 to determine and verify that the control circuit 312 and the gate drive circuit 322 of the signal injection circuit 112 are operating correctly. The gate feedback 340 can be used to check that the control circuit 312 and the gate drive circuit 322 are operating correctly, which is accomplished by comparing the voltage at 340 against the control input 314, the default state input 316, and the system failure state input 318. Notably, other system checks may be implemented for operability verification by the fail-safe system controller 110. In an event that the fail-safe system controller 110 detects a failure or that the signal injection circuit 112 is not operating correctly, then the fail-safe system controller relinquishes control back to system A.

Figure 4:
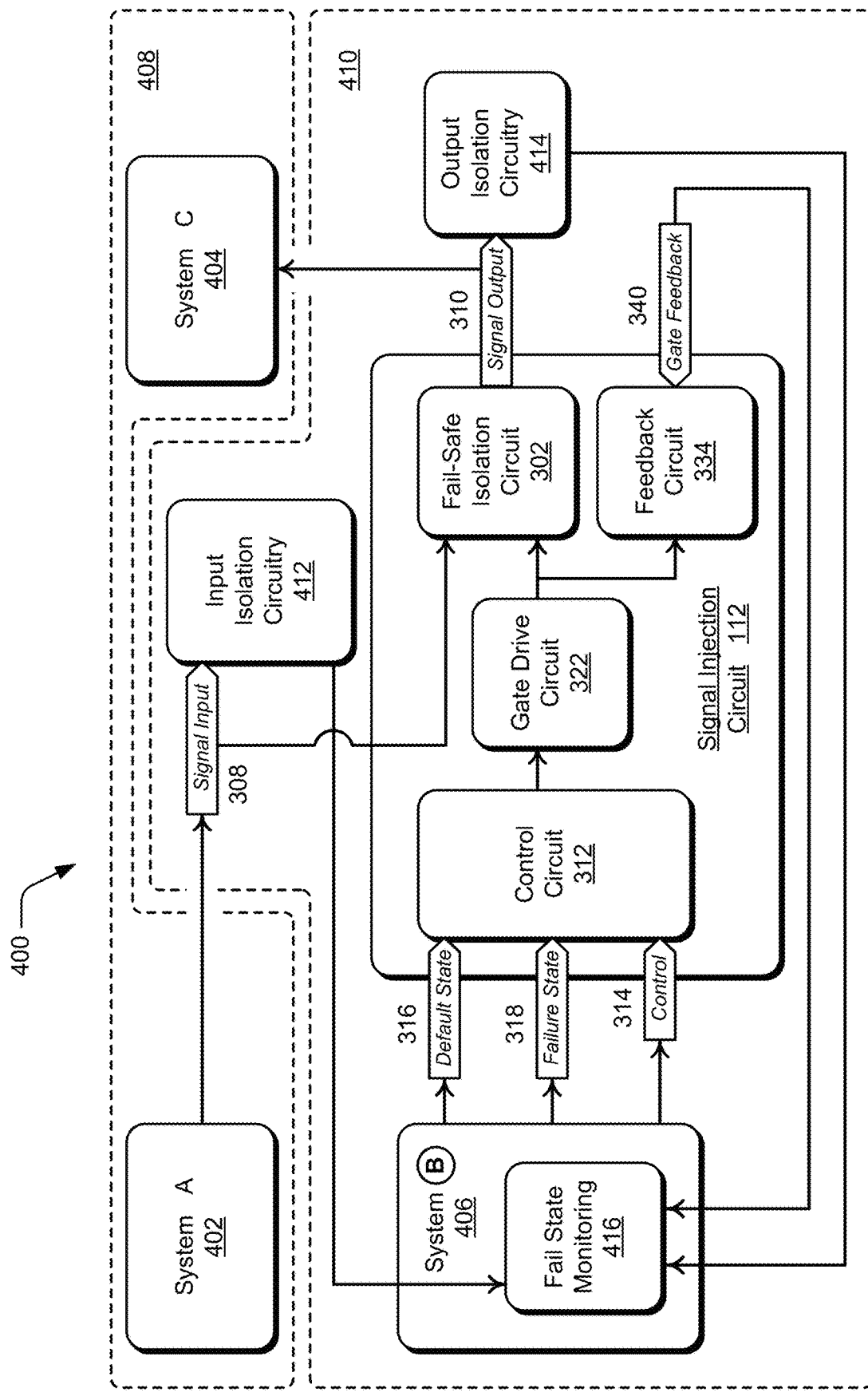
FIGS. 4 and 5 further illustrate a block diagram example of features for fail-safe signal injection in accordance with one or more implementations as described herein.

FIG. 4 further illustrates a block diagram example 400 of features for fail-safe signal injection, such as shown and described with reference to FIGS. 1-3. As shown in this example 400, the electronic system includes system A 402, system C 404, system B 406, and a representation the signal injection circuit 112. As described above, examples of system A include the vehicle control device 102 (FIG. 1) and the first system 202 (FIG. 2). Similarly, examples of system B include the vehicle control system 104 (FIG. 1) and the second system 206 (FIG. 2). An example of system B is the fail-safe system controller 110, which along with the signal injection circuit 112, is implemented as the fail-safe signal injection system 108. This example 400 also illustrates the separable power domains, including a system power domain 408 that encompasses at least system A 402 and system C 404, and a fail-safe power domain 410 that encompasses system B 406 and the signal injection circuit 112 of the fail-safe signal injection system 108.

Figure 5:
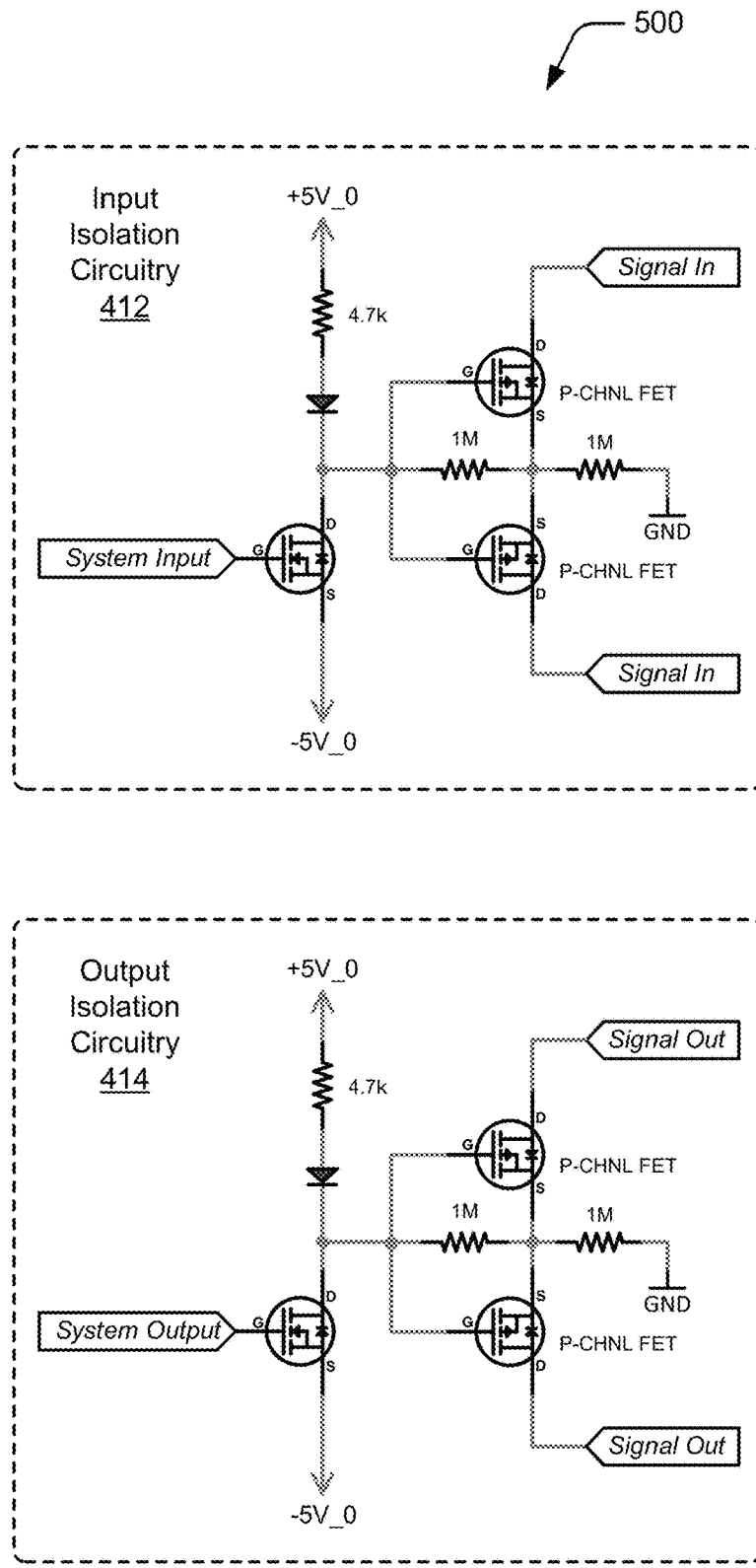

The electronic system in this example 400 also includes input isolation circuitry 412 and output isolation circuitry 414. FIG. 5 illustrates an example 500 of implementations of the input isolation circuitry 412 and output isolation circuitry 414. The isolation circuitry 412, 414 is implemented to maintain signal and voltage isolation, as well as a high impedance for processing elements of the fail-safe system controller 110 and other signal conditioning elements when not powered, thus preventing stray currents or signals from the system power domain 408 entering into the fail-safe power domain 410.

The system B 406 also includes fail state monitoring 416 designed to receive and monitor input signals from system A 402, such as to determine the current state of system A so that the signal injection circuit 112 can be initiated to match the current state of system A. This provides for a clean transition when system B actuates the signal injection circuit 112 to inject signals to system C, which then does not detect that there has been a change of input from system A to system B. In addition to monitoring the transition, the fail state monitoring 416 of system B also receives and monitors the signal input 308 via the input isolation circuitry 412 and the signal output 310 via the output isolation circuitry 414, as well as the gate feedback 340. Notably, the fail state monitoring 416 of system B is also designed to monitor for user inputs at system A, such as human driver inputs to control a vehicle. The system B can then automatically disable the signal injection circuit 112 in the event of a detected user input at system A.

Figure 6:
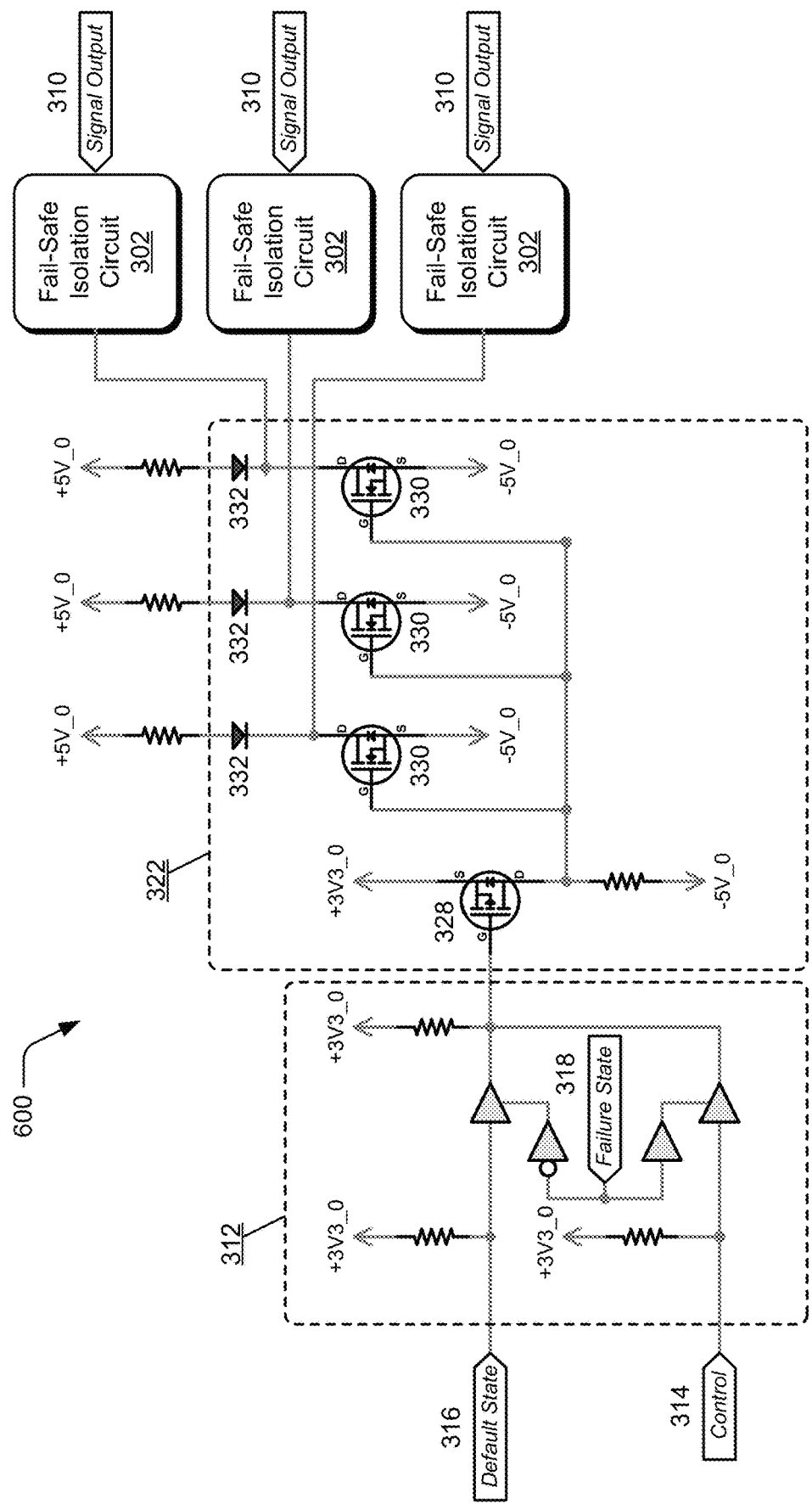
FIG. 6 illustrates an example implementation of a signal injection circuit for fail-safe signal injection in accordance with one or more implementations as described herein.

FIG. 6 further illustrates an example 600 of an implementation of the signal injection circuit 112 for fail-safe signal injection. In this example 600, the control circuit 312 of the signal injection circuit 112 drives a variation of the gate drive circuit 322, which then drives three redundant versions of the fail-safe isolation circuit 302. In this implementation, the signal output 310 of each separate fail-safe isolation circuit 302 is an input to a different system controller of the electronic system. For example, the separate fail-safe isolation circuits 302 may correspond to respective vehicle control systems 104, such as (1) the engine computer that receives a signal output 310 to control the engine according to an accelerator pedal adjustment to increase or decrease the speed of the vehicle; (2) the automatic or anti-lock braking system computer that receives a signal output 310 to control the braking system according to a brake pedal adjustment to stop or decrease the speed of the vehicle; and (3) the steering controller that receives a signal output 310 to actuate the drive motor of the power steering system according to a steering wheel torque input to turn the vehicle.

In this example configuration of the signal injection circuit 112, the three separate fail-safe isolation circuits 302 are interoperative to control the three different vehicle control systems 104, such as the acceleration, braking, and steering of a vehicle. Notably, the operative state of all three of the fail-safe isolation circuits 302 is the same, either to pass the vehicle control inputs 106 from the respective vehicle control devices 102 through to the corresponding vehicle control systems 104 when the fail-safe isolation circuits 302 are not powered, or to bypass the vehicle control devices 102 to inject a control signal 118 into the corresponding vehicle control systems 104 with the signal injection circuit 112 when the fail-safe isolation circuits are powered. In this example configuration, if a failure of one of the fail-safe isolation circuits 302 is detected, then they all fail back to the fail-safe state, which is generally system A connected through to system C, and system B is then isolated in the context described herein. Although the three separate fail-safe isolation circuits 302 are interoperative in this example configuration, they may alternatively be implemented for individual controllability.

Figure 7:
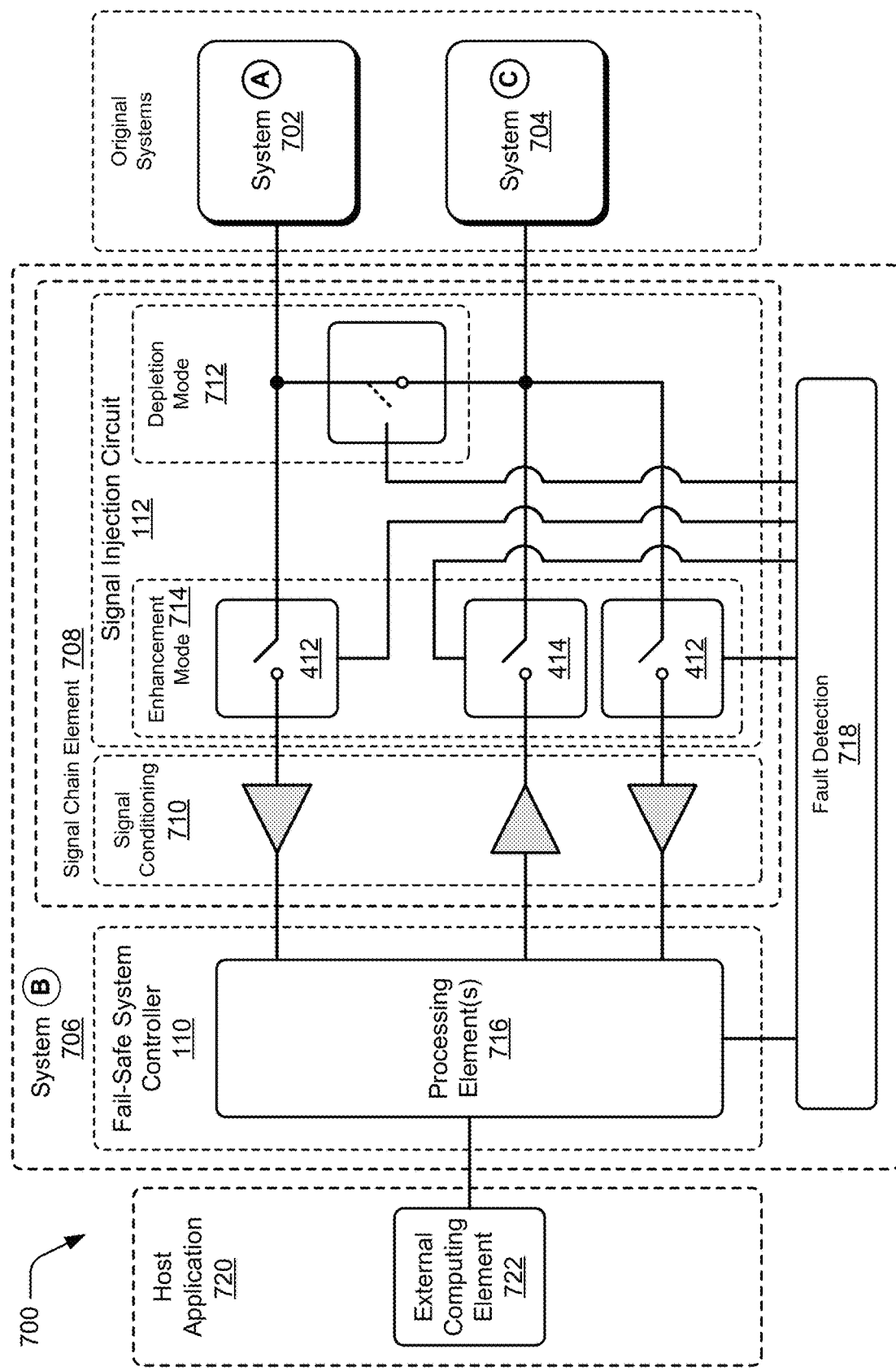
FIG. 7 illustrates an example of a signal chain block diagram of features for fail-safe signal injection in accordance with one or more implementations as described herein.

FIG. 7 further illustrates an example of a signal chain block diagram 700 of features for fail-safe signal injection, such as shown and described with reference to FIGS. 1-6. As shown in this example diagram 700, the electronic system includes a representation of a system A 702 and a system C 704, as well as a system B 706 that is implemented with the fail-safe system controller 110 (e.g., also referred to as an "injection controller") and a signal chain element 708. The signal chain element 708 includes the signal injection circuit 112 (e.g., also referred to as the "multiplexer") and signal conditioning 710. In an electronic circuit, multiple instances of the signal chain element 708 can be implemented on a single device to provide an interface with additional systems, as described herein.

Figure 8:
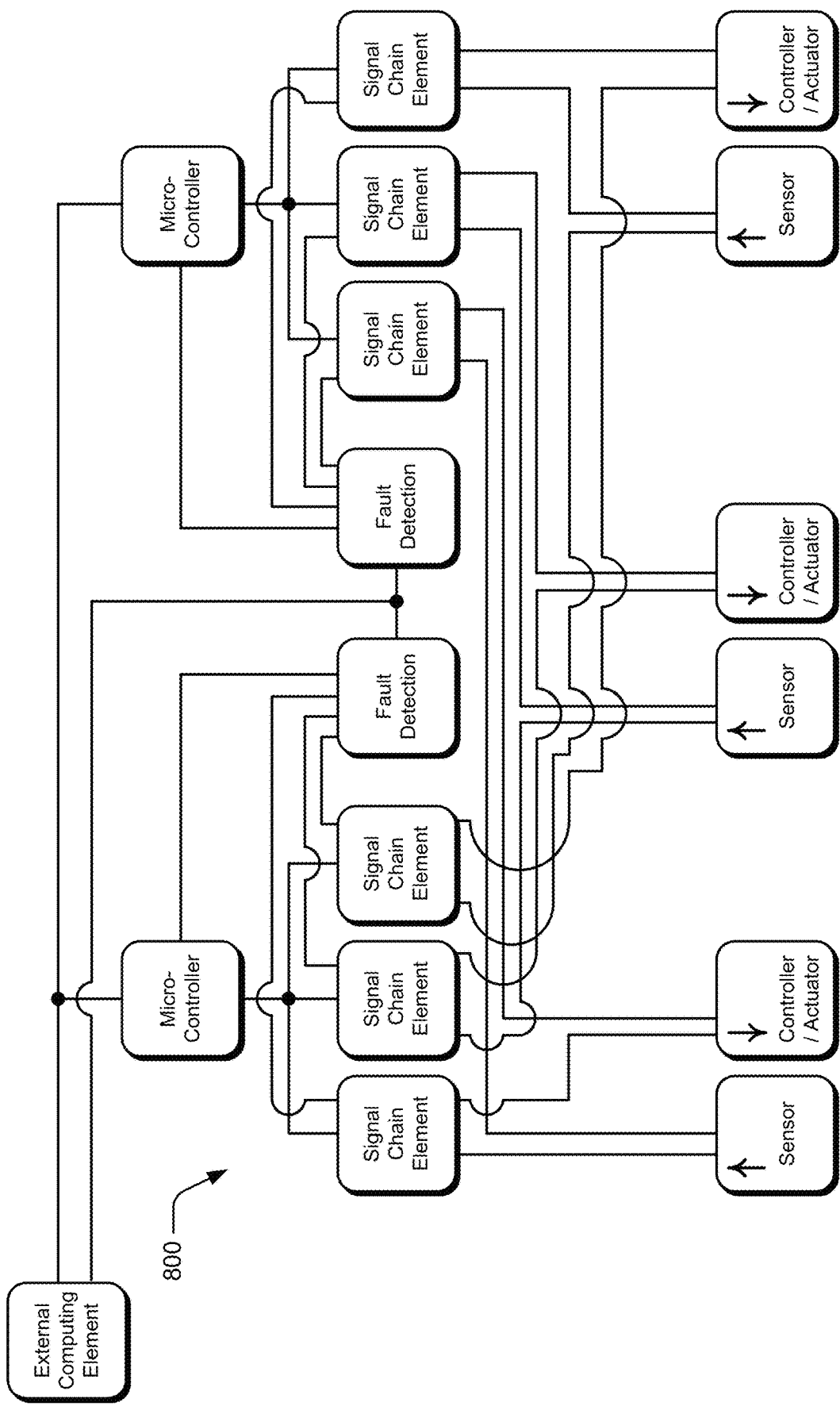
FIG. 8 illustrates an example of redundant signal division in accordance with one or more implementations of fail-safe signal injection as described herein.

Generally, a vehicle may be designed for redundant vehicle control, with two signals generated for each actuator or controller. FIG. 8 illustrates an example of redundant signal division 800 in implementations of fail-safe signal injection. For example, the vehicle control device 102 (system A) described with reference to FIG. 1 may be implemented to generate redundant vehicle control inputs 106, and one each is a separate input to the vehicle control system 104 (system C). Accordingly, the fail-safe signal injection system 108 can be implemented with redundant microcontrollers, such as the fail-safe system controller 110 (system B) to control duplicate signal injection circuits 112, as implemented in the signal chain element 708.

Further in the example diagram 700, the signal injection circuit 112 implements the depletion mode 712 and the enhancement mode 714. Additionally, the fail-safe system controller 110 includes processing element(s) 716, and the system B implements fault detection 718, such as the fail state monitoring 416 shown and described with reference to FIG. 4. A host application 720 includes an external computing element 722 that can generate a control command as an input to the system B.

Example methods 900, 1000, and 1100 are described with reference to respective FIGS. 9-11 in accordance with implementations of fail-safe signal injection. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), Solid State devices, and the like.

Figure 9:
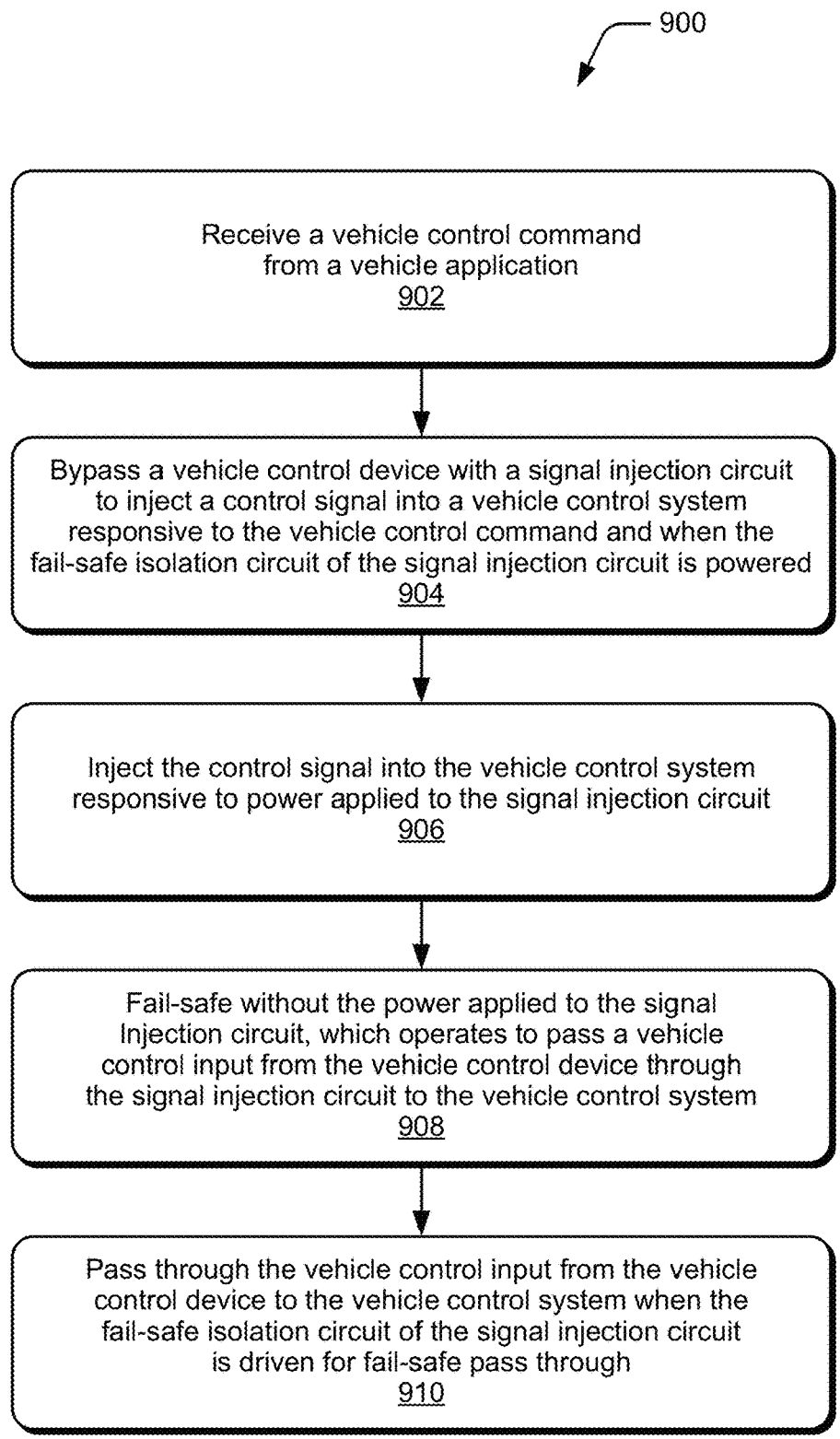
FIGS. 9, 10, and 11 illustrate example method(s) of fail-safe signal injection in accordance with one or more implementations of the techniques described herein.

FIG. 9 illustrates example method(s) 900 of fail-safe signal injection, and is generally described with reference to a fail-safe signal injection system. The order in which the method is described is not intended to be construed as a limitation, and any number or combination of the described method operations can be performed in any order to perform a method, or an alternate method.

At 902, a vehicle control command is received from a vehicle application. For example, the fail-safe system controller 110 of the fail-safe signal injection system 108 receives a vehicle control command 116 from the vehicle application 114. The vehicle application 114 takes the place of human vehicle control that is registered with the vehicle control device 102 and communicated as the vehicle control input 106 to the vehicle control system 104. The fail-safe system controller 110 intervenes in the automotive control system 100, allowing the vehicle application 114 to effectuate a change in the vehicle control with the vehicle control command 116, and without human driver input to the vehicle control system.

At 904, a vehicle control device is bypassed with a signal injection circuit to inject a control signal into a vehicle control system responsive to the vehicle control command and when the fail-safe isolation circuit of the signal injection circuit is powered. For example, the signal injection circuit 112 of the fail-safe signal injection system 108 bypasses the vehicle control device 102 to inject the control signal 118 into the vehicle control system 104 when the fail-safe isolation circuit 302 is powered. The signal injection circuit 112 operates as a multiplexer that interfaces between the vehicle control system 104 and the vehicle application 114 that initiates the vehicle control command 116. In implementations, the fail-safe isolation circuit 302 is implemented with depletion mode FETs designed to isolate the vehicle control device 102, linking the fail-safe system controller 110 to the vehicle control system 104. Additionally, the depletion mode FETs of the fail-safe isolation circuit are designed to fail-safe to link the vehicle control device 102 to the vehicle control system 104 when not powered.

At 906, the control signal is injected into the vehicle control system responsive to power applied to the signal injection circuit. For example, the signal injection circuit 112 of the automotive control system 100 injects the control signal 118 into the vehicle control system 104 responsive to power applied to the signal injection circuit.

At 908, the signal injection circuit fails-safe without the power applied, and operates to pass a vehicle control input from the vehicle control device through the signal injection circuit to the vehicle control system. For example, the signal injection circuit 112 fails-safe without the power applied, and thus operates to pass a vehicle control input 106 from the vehicle control device 102 through the signal injection circuit to the vehicle control system 104. The automotive control system 100 has separable power domains, including a system power domain 120 that encompasses at least the vehicle control device 102 and the vehicle control system 104, and a fail-safe power domain 122 that encompasses the fail-safe system controller 110 and the signal injection circuit 112 of the fail-safe signal injection system 108.

At 910, the vehicle control input is passed through from the vehicle control device to the vehicle control system when the fail-safe isolation circuit of the signal injection circuit is driven for fail-safe pass through. For example, the signal injection circuit 112 includes the fail-safe isolation circuit 302 designed to pass the vehicle control input 106 from the vehicle control device 102 through to the vehicle control system 104 when the fail-safe isolation circuit is driven for fail-safe pass through. Further, in the event of a power failure of the fail-safe power domain 122, the signal injection circuit 112 is designed to fail-safe and disconnect the fail-safe system controller 110 from the system, thus linking or reestablishing the vehicle control device 102 connection to the vehicle control system 104, which is a known safe state of the automotive control system 100 in the vehicle.

Figure 10:
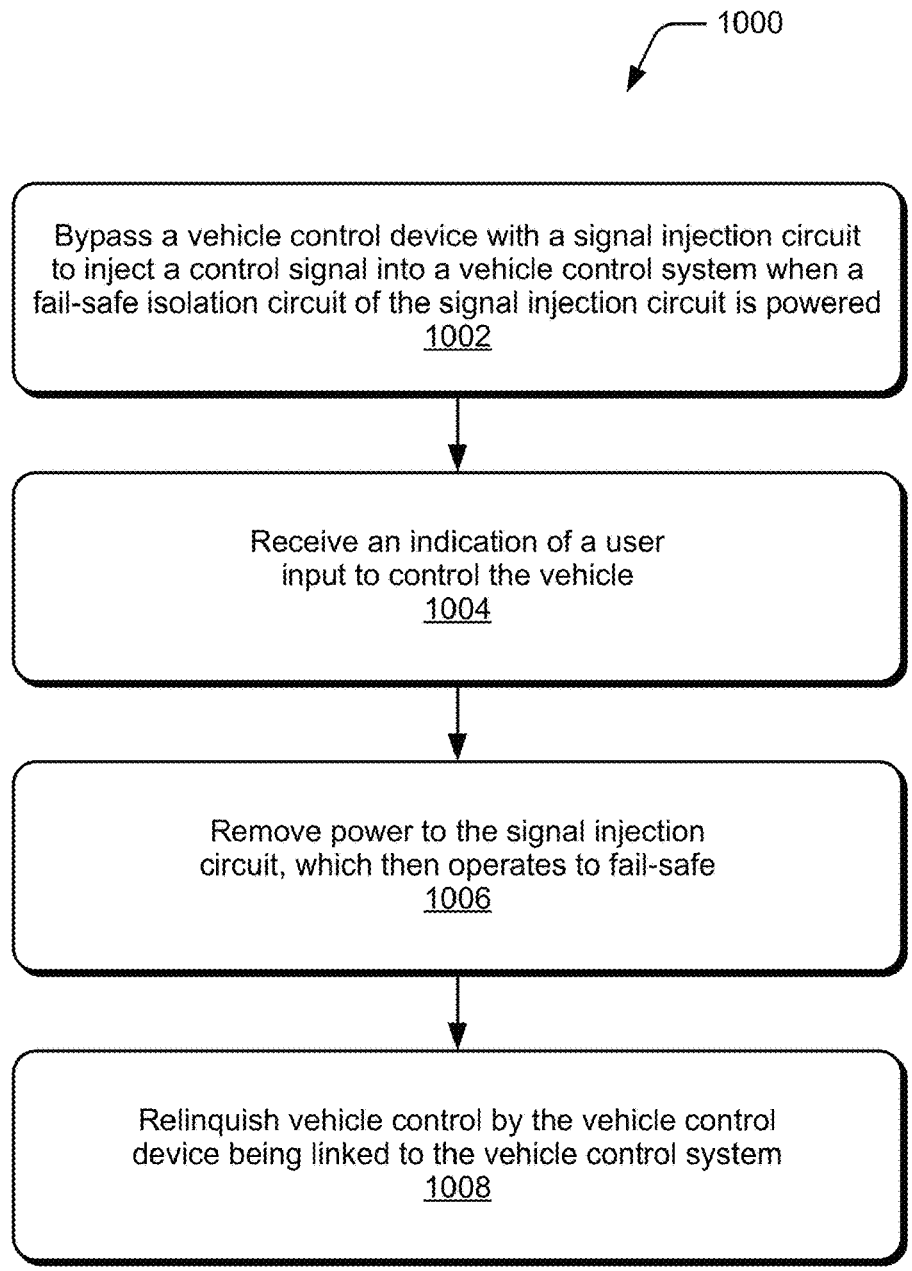

FIG. 10 illustrates example method(s) 1000 of fail-safe signal injection, and is generally described with reference to a fail-safe signal injection system. The order in which the method is described is not intended to be construed as a limitation, and any number or combination of the described method operations can be performed in any order to perform a method, or an alternate method.

At 1002, a vehicle control device is bypassed with a signal injection circuit to inject a control signal into a vehicle control system when a fail-safe isolation circuit of the signal injection circuit is powered. For example, the signal injection circuit 112 of the fail-safe signal injection system 108 bypasses the vehicle control device 102 to inject the control signal 118 into the vehicle control system 104 when the fail-safe isolation circuit 302 is powered. The signal injection circuit 112 operates as a multiplexer that interfaces between the vehicle control system 104 and the vehicle application 114 that initiates the vehicle control command 116. In implementations, the fail-safe isolation circuit 302 is implemented with depletion mode FETs designed to isolate the vehicle control device 102, linking the fail-safe system controller 110 to the vehicle control system 104. Additionally, the depletion mode FETs of the fail-safe isolation circuit are designed to fail-safe to link the vehicle control device 102 to the vehicle control system 104 when not powered.

At 1004, an indication of a user input to control the vehicle is received. For example, the fail-safe system controller 110 receives an indication of a user input to control the vehicle. At 1006, power to the signal injection circuit is removed, which then operates to fail-safe. For example, the fail-safe system controller 110 removes power to the signal injection circuit 112 that operates to fail-safe. At 1008, vehicle control is relinquished by the vehicle control device being linked to the vehicle control system. For example, the fail-safe system controller 110 relinquishes vehicle control by the vehicle control device 102 being linked to the vehicle control system 104. The signal injection circuit 112 fails-safe without the power applied, and thus operates to pass a vehicle control input 106 from the vehicle control device 102 through the signal injection circuit to the vehicle control system 104. The signal injection circuit 112 includes the fail-safe isolation circuit 302 designed to pass the vehicle control input 106 from the vehicle control device 102 through to the vehicle control system 104 when the fail-safe isolation circuit is driven for fail-safe pass through.

Figure 11:
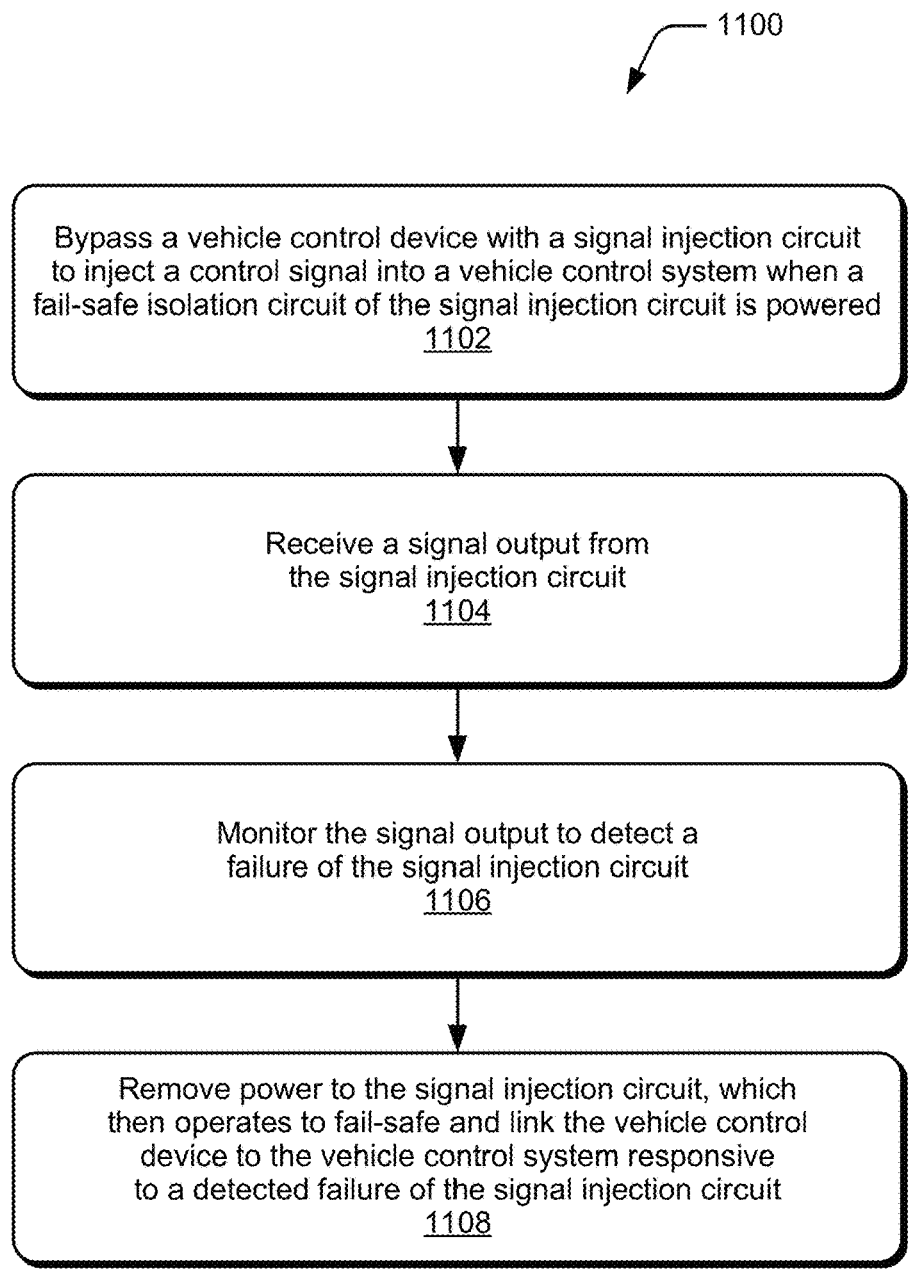

FIG. 11 illustrates example method(s) 1100 of fail-safe signal injection, and is generally described with reference to a fail-safe signal injection system. The order in which the method is described is not intended to be construed as a limitation, and any number or combination of the described method operations can be performed in any order to perform a method, or an alternate method.

At 1102, a vehicle control device is bypassed with a signal injection circuit to inject a control signal into a vehicle control system when a fail-safe isolation circuit of the signal injection circuit is powered. For example, the signal injection circuit 112 of the fail-safe signal injection system 108 bypasses the vehicle control device 102 to inject the control signal 118 into the vehicle control system 104 when the fail-safe isolation circuit 302 is powered. The signal injection circuit 112 operates as a multiplexer that interfaces between the vehicle control system 104 and the vehicle application 114 that initiates the vehicle control command 116. In implementations, the fail-safe isolation circuit 302 is implemented with depletion mode FETs designed to isolate the vehicle control device 102, linking the fail-safe system controller 110 to the vehicle control system 104. Additionally, the depletion mode FETs of the fail-safe isolation circuit are designed to fail-safe to link the vehicle control device 102 to the vehicle control system 104 when not powered.

At 1104, a signal output is received from the signal injection circuit. For example, the fail-safe system controller 110 receives a signal output 310 from the signal injection circuit 112. At 1106, the signal output is monitored to detect a failure of the signal injection circuit. For example, the fail-safe system controller 110 monitors the signal output 310 to detect a failure of the signal injection circuit 112. At 1108, power to the signal injection circuit is removed, which then operates to fail-safe and link the vehicle control device to the vehicle control system responsive to a detected failure of the signal injection circuit. For example, the fail-safe system controller 110 removes power to the signal injection circuit 112, which operates to fail-safe and link the vehicle control device 102 to the vehicle control system 104 responsive to a detected failure of the signal injection circuit.

Figure 12:
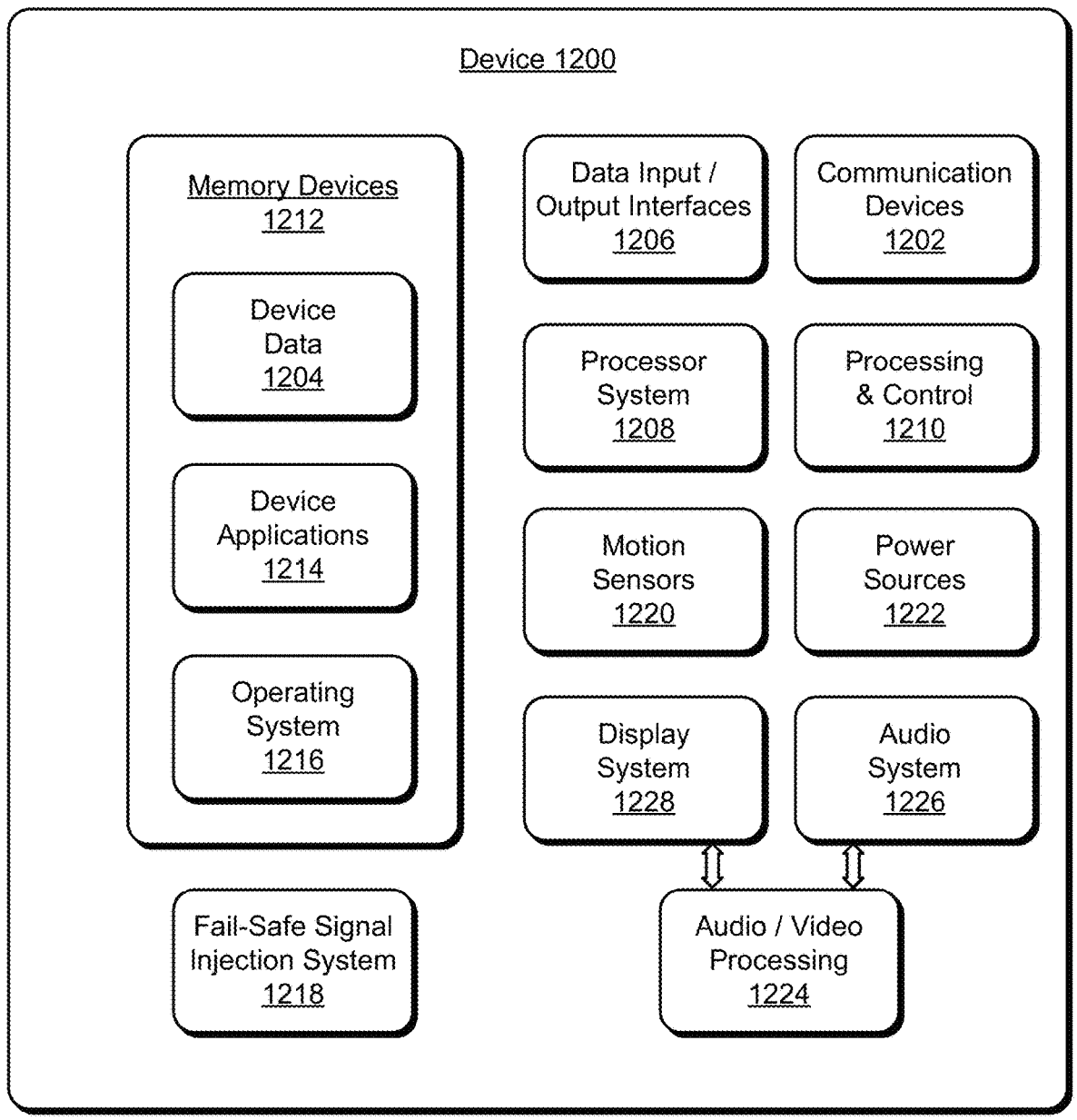
FIG. 12 illustrates various components of an example device that can be used to implement the techniques of fail-safe signal injection as described herein.

FIG. 12 illustrates various components of an example device 1200, which can implement aspects of the techniques and features for fail-safe signal injection, as described herein. The example device 1200 can be implemented as any of the devices described with reference to the previous FIGS. 1-11, such as any type of a control device, control system, fail-safe system controller, and/or any other type of computing and/or electronic device. For example, devices, systems, and controllers described with reference to FIGS. 1-11 may be implemented as the example device 1200.

The example device 1200 can include various, different communication devices 1202 that enable wired and/or wireless communication of device data 1204 with other devices. As described herein, a communication device 1202 may be implemented as any of the communication components implemented in a computing device. The device data 1204 can include any of the various data, signals, and content that is generated, processed, determined, received, stored, and/or transferred from one computing device to another, and/or synched between multiple computing devices. Generally, the device data 1204 can include any form of audio, video, image, graphics, and/or electronic data that is generated by applications executing on a device. The communication devices 1202 can also include transceivers for cellular phone communication and/or for any type of network data communication.

The example device 1200 can also include various, different types of data input/output (I/O) interfaces 1206, such as data network interfaces that provide connection and/or communication links between the devices, data networks, and other devices. The I/O interfaces 1206 can be used to couple the device to any type of components, peripherals, and/or accessory devices, such as a computer input device that may be integrated with the example device 1200. The I/O interfaces 1206 may also include data input ports via which any type of data, information, media content, communications, messages, and/or inputs can be received, such as user inputs to the device, as well as any type of audio, video, image, graphics, and/or electronic data received from any content and/or data source.

The example device 1200 includes a processor system 1208 of one or more processors (e.g., any of microprocessors, controllers, and the like) and/or a processor and memory system implemented as a system-on-chip (SoC) that processes computer-executable instructions. The processor system may be implemented at least partially in computer hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the example device 1200 can be implemented with any one or combination of software, hardware, firmware, or fixed logic circuitry that may be implemented in connection with processing and control circuits, which are generally identified at 1210. The example device 1200 may also include any type of a system bus or other data and command transfer system that couples the various components within the device. A system bus can include any one or combination of different bus structures and architectures, as well as control and data lines.

The example device 1200 also includes memory and/or memory devices 1212 (e.g., computer-readable storage memory) that enable data storage, such as data storage devices implemented in hardware that can be accessed by a computing device, and that provide persistent storage of data and executable instructions (e.g., software applications, programs, functions, and the like). Examples of the memory devices 1212 include volatile memory and non-volatile memory, fixed and removable media devices, and any suitable memory device or electronic data storage that maintains data for computing device access. The memory devices 1212 can include various implementations of random-access memory (RAM), read-only memory (ROM), flash memory, and other types of storage media in various memory device configurations. The example device 1200 may also include a mass storage media device.

The memory devices 1212 (e.g., as computer-readable storage memory) provide data storage mechanisms, such as to store the device data 1204, other types of information and/or electronic data, and various device applications 1214 (e.g., software applications and/or modules). For example, an operating system 1216 can be maintained as software instructions with a memory device and executed by the processor system 1208 as a software application. The device applications 1214 may also include a device manager, such as any form of a control application, software application, signal-processing and control module, code that is specific to a particular device, a hardware abstraction layer for a particular device, and so on. In this example, the device 1200 also includes the device components to implement the various aspects of the described features and techniques for fail-safe signal injection, such as a fail-safe signal injection system 1218.

The example device 1200 can also include motion sensors 1220, such as may be implemented as components of an inertial measurement unit (IMU). The motion sensors 1220 can be implemented with various sensors, such as a gyroscope, an accelerometer, and/or other types of motion sensors to sense motion of the device. The motion sensors 1220 can generate sensor data vectors having three-dimensional parameters (e.g., rotational vectors in x, y, and z-axis coordinates) indicating location, position, acceleration, rotational speed, and/or orientation of the device. The example device 1200 can also include one or more power sources 1222, such as when the device is implemented as a wireless device and/or mobile device. The power sources may include any type of charging and/or power system.

The example device 1200 can also include an audio and/or video processing system 1224 that generates audio data for an audio system 1226 and/or generates display data for a display system 1228. The audio system and/or the display system may include any types of devices or modules that generate, process, display, and/or otherwise render audio, video, display, and/or image data. Display data and audio signals can be communicated to an audio component and/or to a display component via any type of audio and/or video connection or data link. In implementations, the audio system and/or the display system are integrated components of the example device 1200. Alternatively, the audio system and/or the display system are external, peripheral components to the example device.

Although implementations of fail-safe signal injection have been described in language specific to features and/or methods, the appended claims are not necessarily limited to the specific features or methods described. Rather, the specific features and methods are disclosed as example implementations of fail-safe signal injection, and other equivalent features and methods are intended to be within the scope of the appended claims. Further, various different examples are described and it is to be appreciated that each described example can be implemented independently or in connection with one or more other described examples.

Additional aspects of the techniques, features, and/or methods discussed herein relate to one or more of the following:

An automotive control system, comprising: a fail-safe system controller configured to receive a vehicle control command from a vehicle application and initiate to bypass a vehicle control device to inject a control signal into a vehicle control system responsive to the vehicle control command; and a signal injection circuit configured to inject the control signal into the vehicle control system responsive to power applied to the signal injection circuit, the signal injection circuit further configured to fail-safe without the power applied, thus operative to pass a vehicle control input from the vehicle control device through to the vehicle control system.

Alternatively or in addition to the above described automotive control system, any one or combination of: the signal injection circuit includes automotive-grade transistors and is operative as a multiplexer that interfaces between the vehicle control system and the vehicle application that initiates the vehicle control command. The signal injection circuit includes a fail-safe isolation circuit configured to pass the vehicle control input from the vehicle control device through to the vehicle control system when the fail-safe isolation circuit is driven for fail-safe pass through, and bypass the vehicle control device to inject the control signal into the vehicle control system when the fail-safe isolation circuit is driven to isolate the vehicle control device from the vehicle control system. The signal injection circuit comprises depletion mode FETs configured to fail-safe to link the vehicle control device to the vehicle control system when driven for fail-safe pass through. The signal injection circuit comprises depletion mode FETs configured to isolate the vehicle control device, linking the fail-safe system controller to the vehicle control system. The fail-safe system controller is configured to receive an indication of a user input to control the vehicle, and initiate the signal injection circuit to switch to a fail-safe state, relinquishing vehicle control and the vehicle control device being linked to the vehicle control system. The fail-safe system controller is configured to receive a signal output from the signal injection circuit and monitor the signal output to detect a failure of the signal injection circuit, and initiate the signal injection circuit to switch to a fail-safe state, and link the vehicle control device to the vehicle control system responsive to a detected failure of the signal injection circuit. The automotive control system further comprising separable power domains, including a system power domain that encompasses at least the vehicle control device and the vehicle control system, and a fail-safe power domain that encompasses the fail-safe system controller and the signal injection circuit. The signal injection circuit comprises depletion mode FETs configured to fail-safe to link the vehicle control device to the vehicle control system responsive to power loss in the fail-safe power domain.

A fail-safe signal injection system, comprising: a fail-safe system controller configured to receive a control command and initiate to bypass a first system to inject a control signal into a second system responsive to the control command; and a signal injection circuit configured to inject the control signal into the second system responsive to power applied to the signal injection circuit, the signal injection circuit further configured to fail-safe without the power applied, thus operative to pass a control input from the first system through to the second system.

Alternatively or in addition to the above described fail-safe signal injection system, any one or combination of: the control command is received from a vehicle application; the first system is a vehicle control device, bypassed by the signal injection circuit with power applied; the second system is a vehicle control system into which the control signal is injected responsive to the control command by the signal injection circuit with the power applied; and the signal injection circuit is configured to fail-safe without the power applied, thus operative to pass the control input from the vehicle control device through to the vehicle control system. The signal injection circuit is operative as a multiplexer that interfaces between the second system and a device application that initiates the control command. The signal injection circuit includes a fail-safe isolation circuit configured to pass the control input from the first system through to the second system when the fail-safe isolation circuit is driven for fail-safe pass through, and bypass the first system to inject the control signal into the second system when the fail-safe isolation circuit is driven to isolate the first system from the second system. The signal injection circuit comprises depletion mode FETs configured to fail-safe to link the first system to the second system when driven for fail-safe pass through. The signal injection circuit comprises depletion mode FETs configured to isolate the first system, linking the fail-safe system controller to the second system. The fail-safe system controller is configured to receive a signal output from the signal injection circuit and monitor the signal output to detect a failure of the signal injection circuit, and initiate the signal injection circuit to switch to a fail-safe state, and link the first system to the second system responsive to a detected failure of the signal injection circuit. The fail-safe signal injection system further comprising separable power domains, including a system power domain that encompasses at least the first system and the second system, and a fail-safe power domain that encompasses the fail-safe system controller and the signal injection circuit. The signal injection circuit comprises depletion mode FETs configured to fail-safe to link the first system to the second system responsive to power loss in the fail-safe power domain.

A method for fail-safe signal injection, comprising: receiving a vehicle control command from a vehicle application; bypassing a vehicle control device with a signal injection circuit to inject a control signal into a vehicle control system responsive to the vehicle control command; injecting the control signal into the vehicle control system responsive to power applied to the signal injection circuit; and failing-safe without the power applied to the signal injection circuit, operative to pass a vehicle control input from the vehicle control device through the signal injection circuit to the vehicle control system.

Alternatively or in addition to the above described method for fail-safe signal injection, any one or combination of: passing the vehicle control input from the vehicle control device through to the vehicle control system when a fail-safe isolation circuit of the signal injection circuit is driven for fail-safe pass through, and bypassing the vehicle control device to inject the control signal into the vehicle control system when the fail-safe isolation circuit of the signal injection circuit is powered.

The invention claimed is:

1. An automotive control system, comprising:
a fail-safe system controller configured to receive a vehicle control command from a vehicle application and initiate to bypass a vehicle control device to inject a control signal corresponding to the vehicle control command into a vehicle control system responsive to the vehicle control command;
a signal injection circuit configured to inject the control signal corresponding to the vehicle control command into the vehicle control system responsive to power applied to the signal injection circuit, the signal injection circuit further configured to fail-safe without the power applied to the signal injection circuit, thus operative to pass a vehicle control input from the vehicle control device through to the vehicle control system, wherein the signal injection circuit includes a fail-safe isolation circuit configured to:
pass the vehicle control input from the vehicle control device through to the vehicle control system when the fail-safe isolation circuit is driven for fail-safe pass through; and
bypass the vehicle control device to inject the control signal into the vehicle control system when the fail-safe isolation circuit is driven to isolate the vehicle control device from the vehicle control system.

2. The automotive control system as recited in claim 1, wherein the signal injection circuit includes automotive-grade transistors and is operative as a multiplexer that interfaces between the vehicle control system and the vehicle application that initiates the vehicle control command.

3. The automotive control system as recited in claim 1, wherein the signal injection circuit comprises depletion mode FETs configured to fail-safe to link the vehicle control device to the vehicle control system when driven for fail-safe pass through.

4. The automotive control system as recited in claim 1, wherein the signal injection circuit comprises depletion mode FETs configured to isolate the vehicle control device, linking the fail-safe system controller to the vehicle control system.

5. The automotive control system as recited in claim 1, wherein the fail-safe system controller is configured to receive an indication of a user input to the vehicle control device to control a vehicle, and initiate the signal injection circuit to switch to a fail-safe state, relinquishing vehicle control and the vehicle control device being linked to the vehicle control system.

6. The automotive control system as recited in claim 1, wherein the fail-safe system controller is configured to:
receive a signal output from the signal injection circuit and monitor the signal output to detect a failure of the signal injection circuit; and
initiate the signal injection circuit to switch to a fail-safe state, and link the vehicle control device to the vehicle control system responsive to a detected failure of the signal injection circuit.

7. The automotive control system as recited in claim 1, further comprising separable power domains, including a system power domain that encompasses at least the vehicle control device and the vehicle control system, and a fail-safe power domain that encompasses the fail-safe system controller and the signal injection circuit.

8. The automotive control system as recited in claim 7, wherein the signal injection circuit comprises depletion mode FETs configured to fail-safe to link the vehicle control device to the vehicle control system responsive to power loss in the fail-safe power domain.

9. A fail-safe signal injection system, comprising:
a fail-safe system controller configured to receive a control command and initiate to bypass a first system to inject a control signal into a second system responsive to the control command;

a signal injection circuit configured to inject the control signal into the second system responsive to power applied to the signal injection circuit, the signal injection circuit further configured to fail-safe without the power applied to the signal injection circuit, thus operative to pass a control input from the first system through to the second system, the signal injection circuit including enhancement mode isolation circuitry to maintain signal and voltage isolation for fail-safe operation, wherein the signal injection circuit includes a fail-safe isolation circuit configured to:
   pass the control input from the first system through to the second system when the fail-safe isolation circuit is driven for fail-safe pass through; and
   bypass the first system to inject the control signal into the second system when the fail-safe isolation circuit is driven to isolate the first system from the second system.

10. The fail-safe signal injection system as recited in claim 9, wherein:
   the control command is received from a vehicle application;
   the first system is a vehicle control device, bypassed by the signal injection circuit with the power applied;
   the second system is a vehicle control system into which the control signal is injected responsive to the control command by the signal injection circuit with the power applied; and
   the signal injection circuit is configured to fail-safe without the power applied, thus operative to pass the control input from the first system through to the second system.

11. The fail-safe signal injection system as recited in claim 9, wherein the signal injection circuit is operative as a multiplexer that interfaces between the second system and a device application that initiates the control command.

12. The fail-safe signal injection system as recited in claim 9, wherein the signal injection circuit comprises depletion mode FETs configured to fail-safe to link the first system to the second system when driven for the fail-safe pass through.

13. The fail-safe signal injection system as recited in claim 9, wherein the signal injection circuit comprises depletion mode FETs configured to isolate the first system, linking the fail-safe system controller to the second system.

14. The fail-safe signal injection system as recited in claim 9, wherein the fail-safe system controller is configured to:
   receive a signal output from the signal injection circuit and monitor the signal output to detect a failure of the signal injection circuit; and
   initiate the signal injection circuit to switch to a fail-safe state, and link the first system to the second system responsive to a detected failure of the signal injection circuit.

15. The fail-safe signal injection system as recited in claim 9, further comprising separable power domains, including a system power domain that encompasses at least the first system and the second system, and a fail-safe power domain that encompasses the fail-safe system controller and the signal injection circuit.

16. The fail-safe signal injection system as recited in claim 15, wherein the signal injection circuit comprises depletion mode FETs configured to fail-safe to link the first system to the second system responsive to power loss in the fail-safe power domain.

17. A method for fail-safe signal injection, the method comprising:
   receiving a vehicle control command from a vehicle application;
   bypassing a vehicle control device with a signal injection circuit to inject a control signal corresponding to the vehicle control command into a vehicle control system responsive to the vehicle control command;
   injecting the control signal corresponding to the vehicle control command into the vehicle control system responsive to power applied to the signal injection circuit;
   failing-safe without the power applied to the signal injection circuit, thus operative to pass a vehicle control input from the vehicle control device through the signal injection circuit to the vehicle control system, wherein a fail-safe isolation circuit performs:
      passing the vehicle control input from the vehicle control device through to the vehicle control system when the fail-safe isolation circuit of the signal injection circuit is driven for fail-safe pass through; and
      bypassing the vehicle control device to inject the control signal into the vehicle control system when the fail-safe isolation circuit of the signal injection circuit is driven to isolate the vehicle control device from the vehicle control system.

18. The method as recited in claim 17, wherein automotive-grade transistors are operative as a multiplexer interfacing between the vehicle control system and the vehicle application that initiates the vehicle control command.

19. The method as recited in claim 17, wherein depletion mode FETs fail-safe, linking the vehicle control device to the vehicle control system when driven for fail-safe pass through.

20. The method as recited in claim 17, further comprising:
   receiving an indication of a user input to the vehicle control device to control a vehicle; and
   initiating the signal injection circuit to switch to a fail-safe state, relinquishing vehicle control and the vehicle control device being linked to the vehicle control system.

* * * * *